(12) United States Patent
Koito et al.

(10) Patent No.: US 9,097,901 B2
(45) Date of Patent: Aug. 4, 2015

(54) DISPLAY DEVICE

(71) Applicant: Japan Display Inc., Tokyo (JP)

(72) Inventors: Takeo Koito, Tokyo (JP); Daisuke Takama, Kanagawa (JP)

(73) Assignee: Japan Display Inc., Tokyo (JP)

( * ) Notice: Subject to any disclaimer, the term of this patent is extended or adjusted under 35 U.S.C. 154(b) by 201 days.

(21) Appl. No.: 13/754,534

(22) Filed: Jan. 30, 2013

(65) Prior Publication Data

US 2013/0242386 A1   Sep. 19, 2013

(30) Foreign Application Priority Data

Mar. 13, 2012   (JP) .................................. 2012-055225

(51) Int. Cl.
 *G02B 27/22*   (2006.01)
 *H04N 13/04*   (2006.01)

(52) U.S. Cl.
 CPC ........ *G02B 27/2214* (2013.01); *H04N 13/0409* (2013.01); *H04N 13/0422* (2013.01)

(58) Field of Classification Search
 CPC ........... G02B 27/2214; H04N 13/0422; H04N 13/0409
 See application file for complete search history.

(56) References Cited

U.S. PATENT DOCUMENTS

| | | | |
|---|---|---|---|
| 2005/0280602 A1* | 12/2005 | Tzschoppe et al. | ............ 345/3.1 |
| 2011/0157696 A1* | 6/2011 | Bennett et al. | ................ 359/462 |
| 2012/0013606 A1 | 1/2012 | Tsai et al. | |

FOREIGN PATENT DOCUMENTS

| | | |
|---|---|---|
| JP | 10-186294 | 7/1998 |
| JP | 2007-183611 | 7/2007 |
| JP | 2008-092361 A | 4/2008 |
| JP | 2008-249887 A | 10/2008 |
| JP | 2009-157118 A | 7/2009 |
| JP | 2009-237541 | 10/2009 |
| JP | 2011-197676 A | 10/2011 |

OTHER PUBLICATIONS

Japanese Office Action issued Feb. 3, 2015 for corresponding Japanese Application No. 2012-055225.

\* cited by examiner

*Primary Examiner* — Joseph P Martinez
(74) *Attorney, Agent, or Firm* — Fishman Stewart Yamaguchi PLLC

(57) ABSTRACT

A display device includes a display portion and an opening portion. In the display portion, pixels having different optical characteristics are arranged. The opening portion is arranged so as to face a display surface side of the display portion and causes a light from the display portion to pass in a predetermined direction. With respect to the pixels having the different optical characteristics in the display portion, the pixels having the same color are located in the opening portion.

11 Claims, 18 Drawing Sheets

F I G . 5
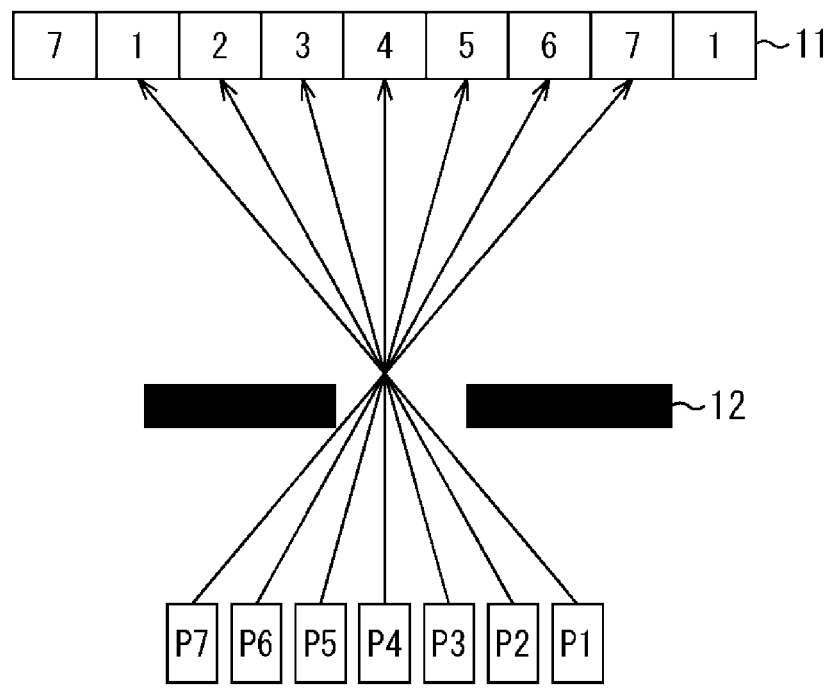

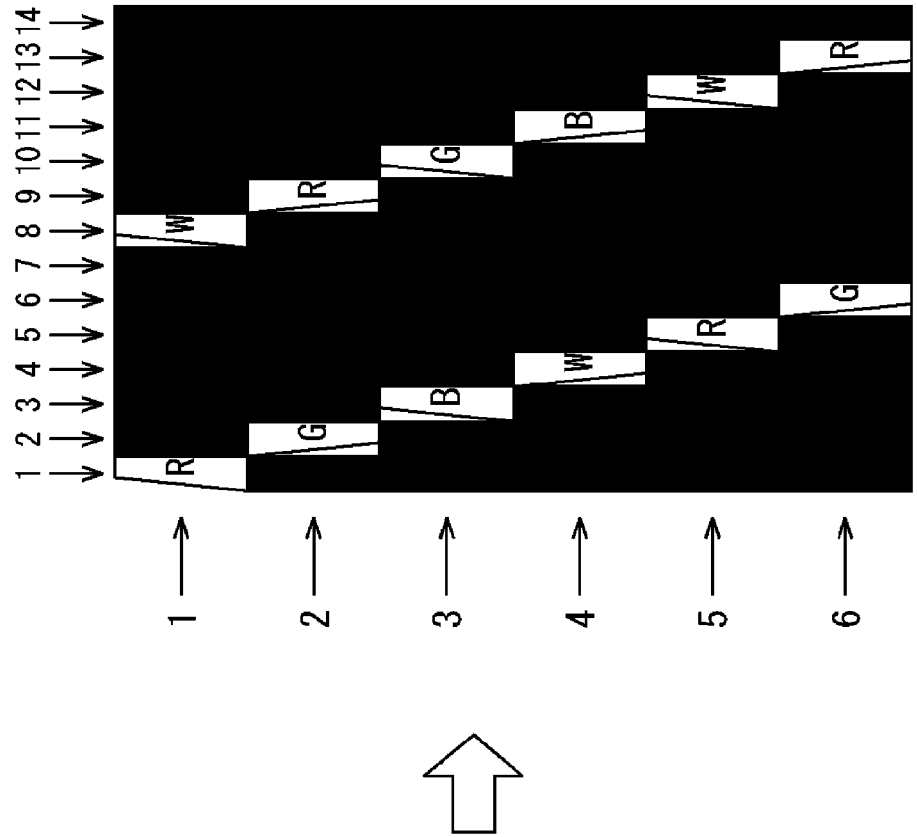
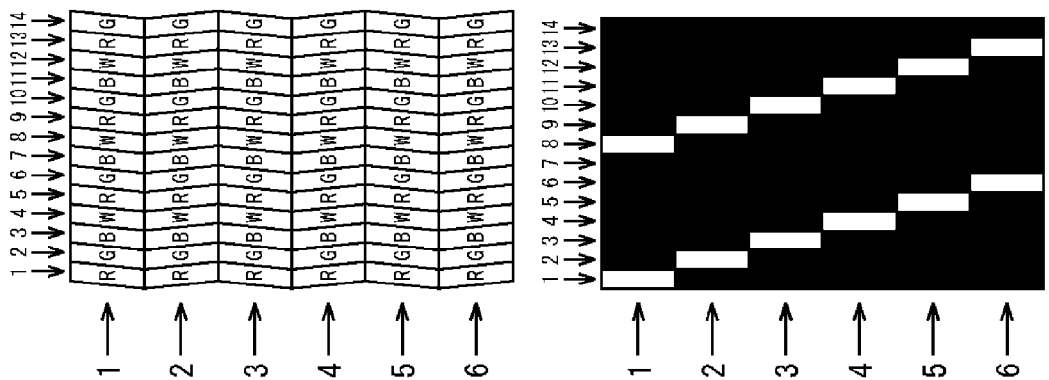
FIG.6C
FIG.6A
FIG.6B

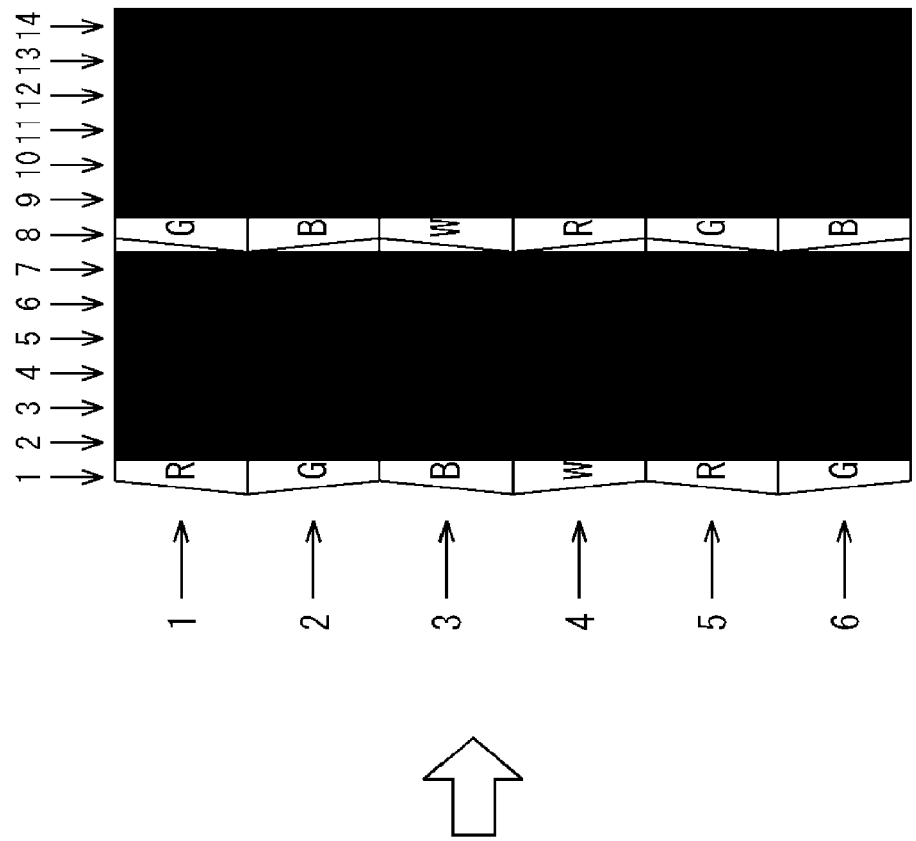
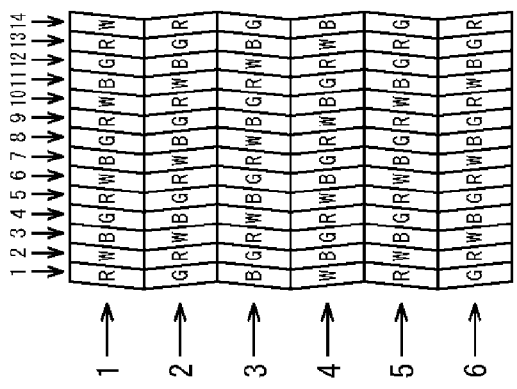
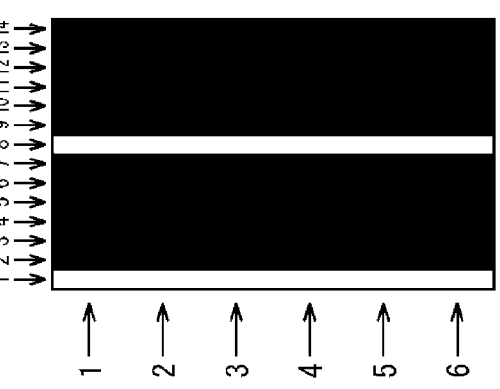

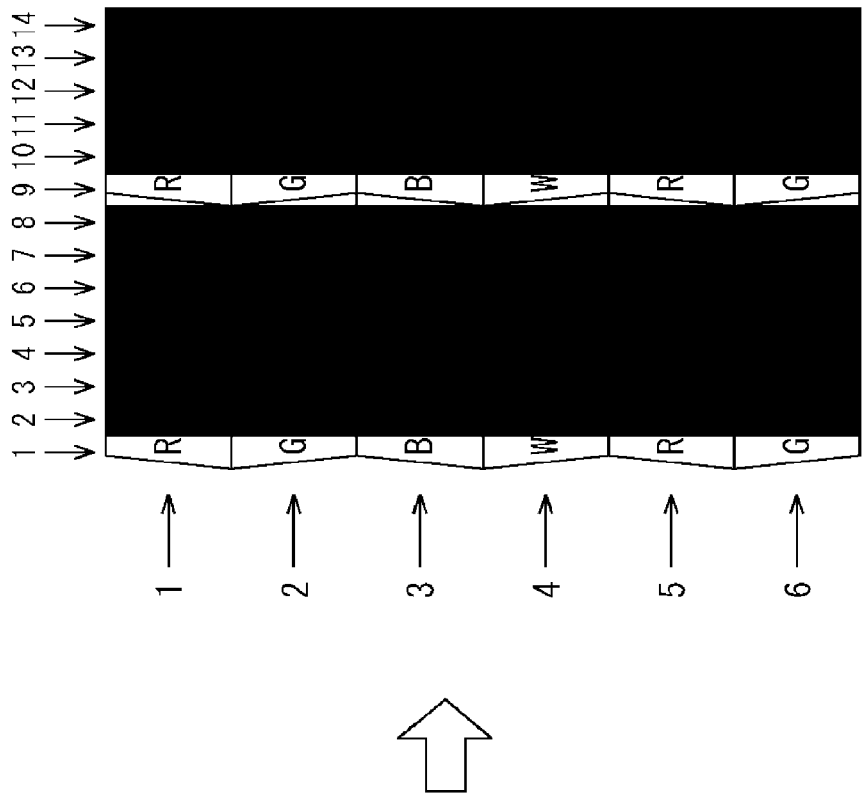
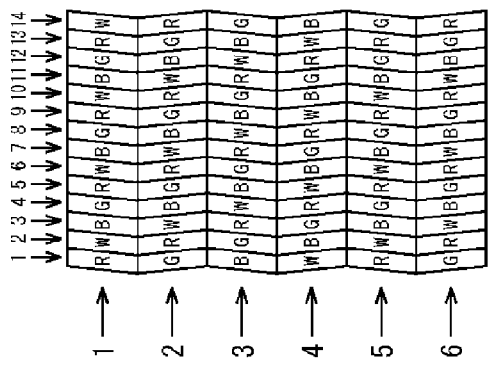
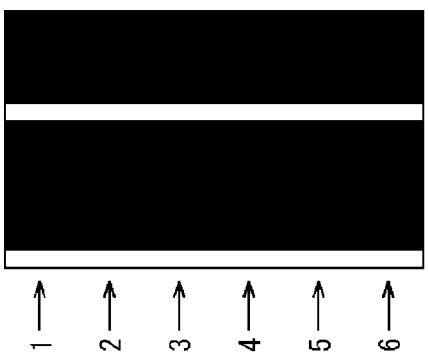

FIG.12

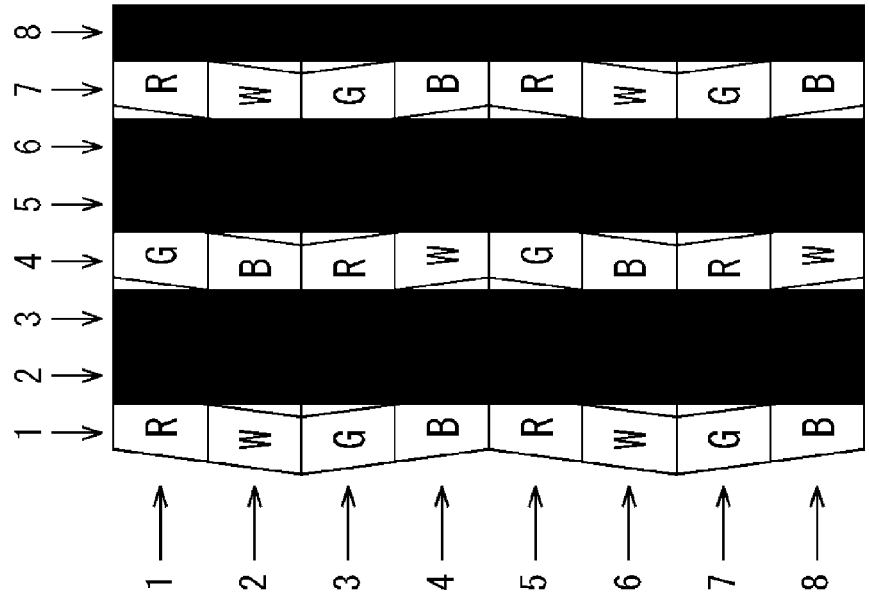
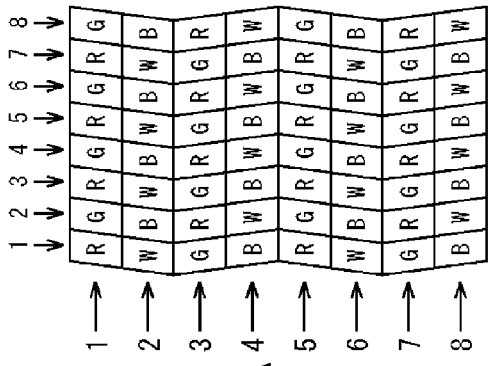
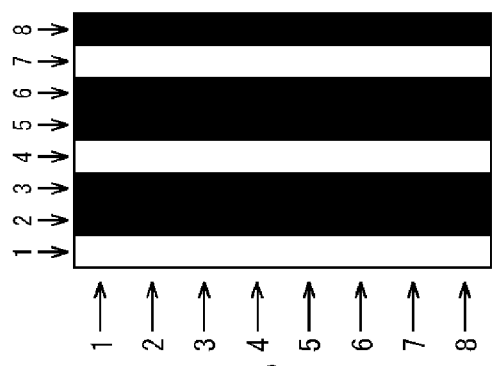
FIG. 13C
FIG. 13A
FIG. 13B

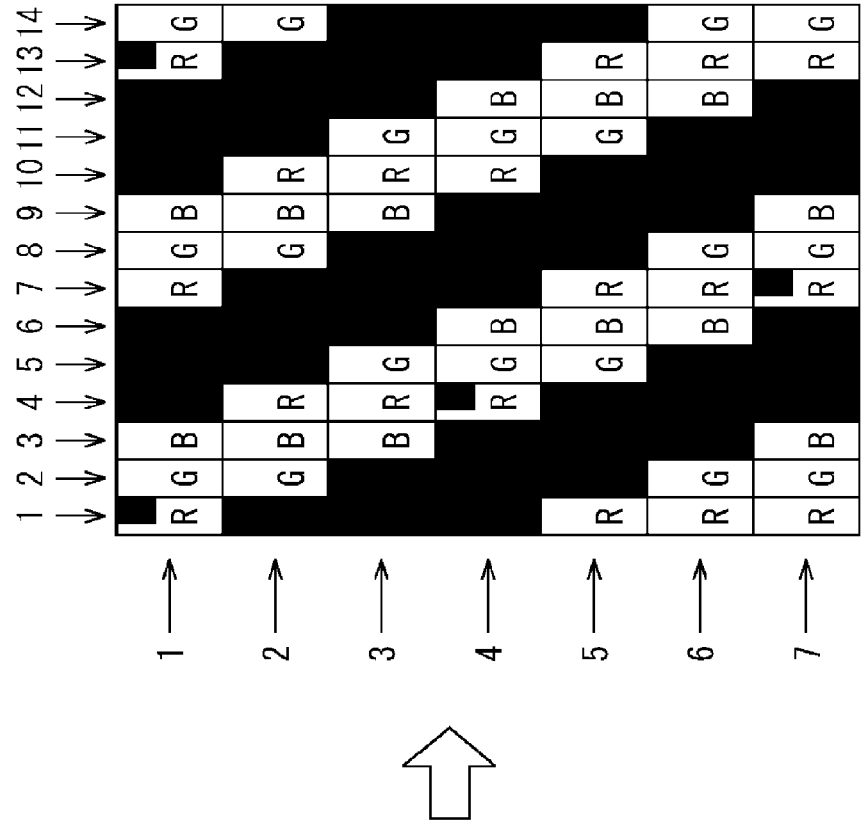
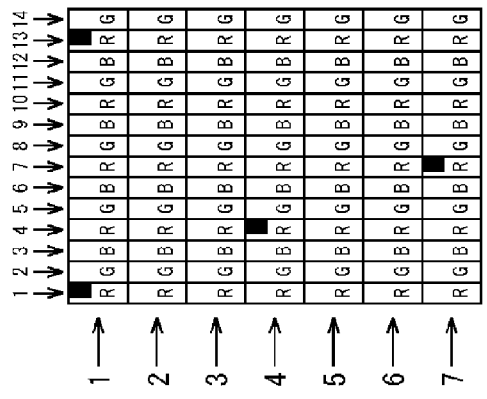
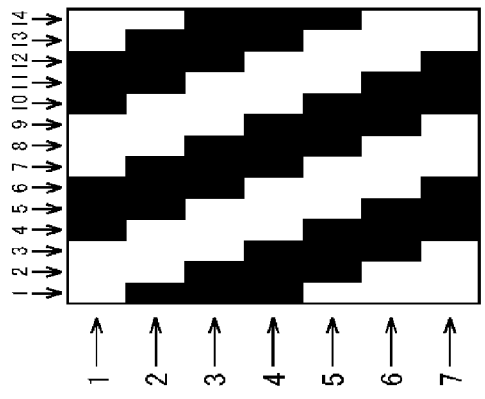
FIG.15C
FIG.15A
FIG.15B

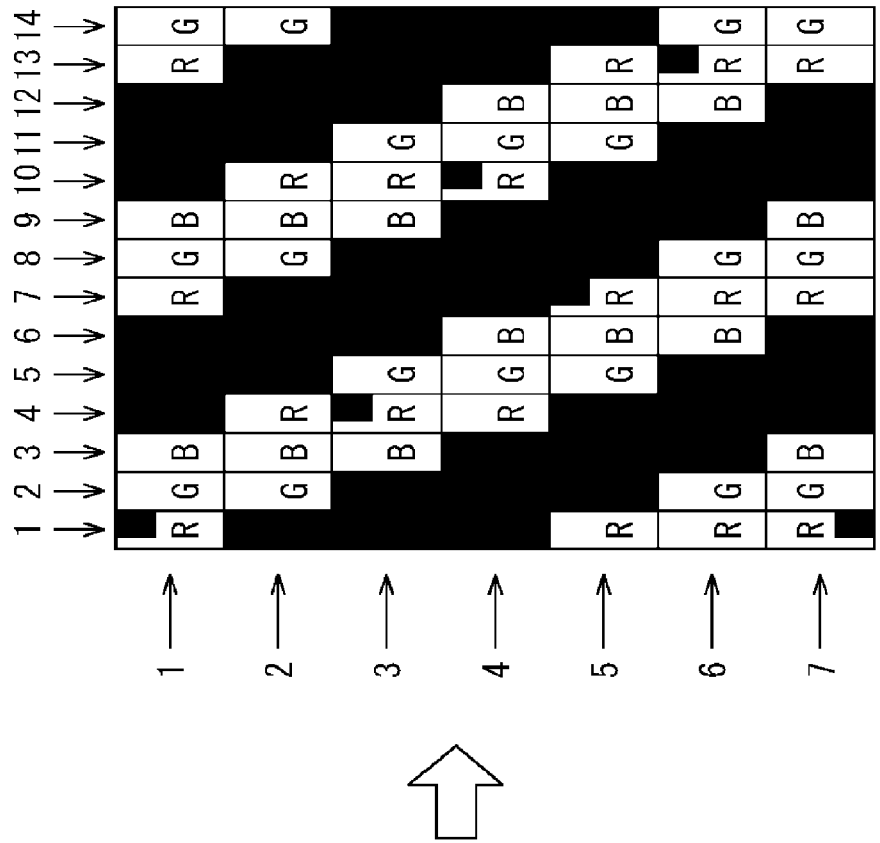
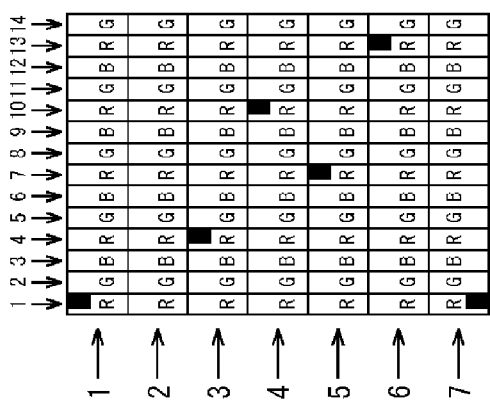
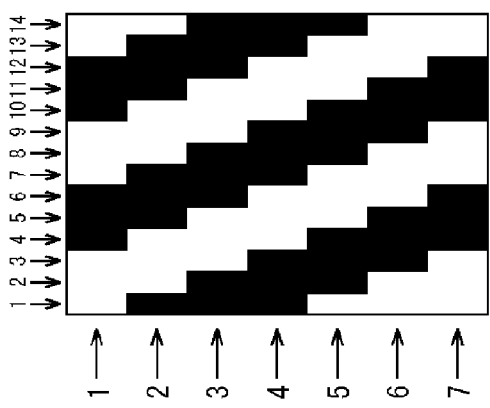

DISPLAY DEVICE

BACKGROUND

The present disclosure relates to a display device. More particularly, the present disclosure relates to a display device which is suitable for being used when a three-dimensional image is provided by using a display portion in which pixels having different optical characteristics are arranged.

In recent years, three-dimensional (3D) video image contents with which a video image can be stereoscopically, visually recognized have attracted attention. As far as a system for appreciating a three-dimensional video image, a binocular parallax system with which a viewer appreciates a video image for a left eye and a video image for a right eye having a parallax provided between them is becoming widely used. The binocular parallax system roughly includes two kinds of systems: an eye glass system using eye glasses; and a naked eye system not using the eye glasses.

The naked eye system includes a lenticular screen system, a parallax barrier system, and the like. The lenticular screen system is a system such that an optical path of a video image for a left eye and an optical path of a video image for a right eye are separated from each other by arranging fine barrel roofed lenses (lenticular lenses). Also, the parallax barrier system is a system such that an optical path of a video image for a left eye and an optical path of a video image for a right eye are separated from each other by longitudinal slits (parallax barrier).

In such a manner, the barrier system, the lens system, and the like are a mainstream in the technique for the naked eye 3D display. In the case of these systems, the barrier, the lens or the like is disposed in the front of the display device and thus a direction of a light is controlled, whereby in the case of 3D of two parallaxes, the pixels of the display device are allocated to the pixels for the right eye, and the pixels for the left eye. In addition, in the case of 3D of multiple parallaxes, the pixels of the display device are allocated in correspondence to a point(s) of view for one parallax, two parallaxes, three parallaxes, . . . .

In this case, a color of the pixel viewed is biased depending on an observation position as well as the color arrangement of RGB, and thus the picture is colored in some cases. For the purpose of preventing such coloring in the 3D image, a technique described in Japanese Patent Laid-Open No. 2007-183611 proposes that the coloring in the 3D image is prevented by removing the color biasing.

A technique described in Japanese Patent Laid-Open No. 2009-237541 proposes a wide-viewing angle imaging device which is high in pixel aperture ratio, and thus can carry out bright display.

SUMMARY

The technique described in Japanese Patent Laid-Open No. 2007-183611 proposes that the coloring in the 3D image is prevented by removing the color biasing. However, when the technique described in Japanese Patent Laid-Open No. 2007-183611 is applied to a dual-domain structure as described in Japanese Patent Laid-Open No. 2009-237541, it is possible that a streak, cross talk, Moire or the like is generated. In the case of the display device having the dual-domain structure described in Japanese Patent Laid-Open No. 2009-237541, since the viewing angle characteristics are interpolated not only within the pixel, but also among the pixels, the characteristics are different among the pixels.

In such a case where the viewing angle characteristics are interpolated not only within the pixel, but also among the pixels, when the barrier system or the lens system is applied, thereby providing the 3D image, it is possible that the streak, the cross talk or the Moire is generated. In addition, the possibility that the viewing angle characteristics are generated is also present in the case where a cut-out is present in a predetermined pixel, in the case where there are two or more kinds of pixels different in size from one another, or the like due to the arrangement or the like of a spacer provided for an adjustment of a whiteness degree or for ensuring a cell gap.

The present disclosure has been made in order to solve the problems described above, and it is therefore desirable to provide a display device which is capable of carrying out such display corresponding to such stereoscopic display or multi-view display as to prevent viewing angle characteristics from being generated.

In order to attain the desire described above, according to an embodiment of the present disclosure, there is provided a display device including: a display portion in which pixels having different optical characteristics are arranged; and an opening portion arranged so as to face a display surface side of the display portion and causing a light from said display portion to pass in a predetermined direction, in which with respect to the pixels having the different optical characteristics in the display portion, the pixels having the same color are located in the opening portion.

According to another embodiment of the present disclosure, there is provided a display device including: a display portion in which pixels having different optical characteristics are arranged; and an opening portion arranged so as to face a display surface side of the display portion and causing a light from the display portion to pass in a predetermined direction, in which the opening portion is provided in such a position that a parallax image supplied to a predetermined point of view is composed of the pixels having the same optical characteristics in the display portion.

According to still another embodiment of the present disclosure, there is provided a display device including: a display portion in which pixels having different optical characteristics are arranged; and an opening portion arranged so as to face a display surface side of the display portion and causing a light from said display portion to pass in a predetermined direction, in which with respect to the pixels having the different optical characteristics in the display portion, the pixels having the same colors are present within the opening portion in a mixed manner.

According to yet another embodiment of the present disclosure, there is provided a display device including: a display portion in which pixels having different optical characteristics are arranged; and an opening portion arranged so as to face a display surface side of the display portion and causing a light from the display portion to pass in a predetermined direction, in which with respect to the pixels having the different optical characteristics in the display portion, the pixels having the same color are included equally every opening portion.

In the embodiment of the present disclosure described above, the display device is at least composed of the display portion in which the pixels having the different optical characteristics are arranged, and the opening portion which is arranged so as to face the display surface side of the display portion, and which causes the light from the display portion to pass in the predetermined direction. Also, with respect to the pixels having the different optical characteristics in the display portion, the pixels having the same color are located in the opening portion.

Or, the opening portion is provided in such a position that the parallax image supplied to the predetermined point of view is composed of the pixels having the same optical characteristics in the display portion. Or, with respect to the pixels having the different optical characteristics in the display portion, the pixels having the same colors are present within the opening portion in the mixed manner. Or, with respect to the pixels having the different optical characteristics in the display portion, the pixels having the same color are included equally every opening portion.

As set forth hereinabove, according to the present disclosure, it is possible to carry out the display corresponding to such stereoscopic display or multi-view display as to prevent the viewing angle characteristics from being generated.

BRIEF DESCRIPTION OF THE DRAWINGS

FIG. 5 is a view explaining seven points of view;

FIGS. 6A, 6B, and 6C are respectively views explaining a relationship between an arrangement of sub pixels, and a parallax barrier;

FIGS. 10A, 10B, and 10C are respectively views explaining a relationship between an arrangement of sub pixels, and a parallax barrier;

FIGS. 11A, 11B, and 11C are respectively views explaining a relationship between an arrangement of sub pixels, and a parallax barrier in a display device according to a third embodiment of the present disclosure;

FIG. 12 is a view explaining another shape of the sub pixels;

FIGS. 13A, 13B, and 13C are respectively views explaining a relationship between an arrangement of sub pixels, and a parallax barrier;

FIGS. 15A, 15B, and 15C are respectively views explaining a relationship between an arrangement of sub pixels, and a parallax barrier;

FIGS. 16A, 16B, and 16C are respectively views explaining a relationship between an arrangement of sub pixels, and a parallax barrier in a display device according to a fifth embodiment of the present disclosure;

DETAILED DESCRIPTION OF THE PREFERRED EMBODIMENTS

Embodiments of the present disclosure will be described in detail hereinafter with reference to the accompanying drawings.

The present disclosure will be described below can be applied to a device for displaying a stereoscopic image. The stereoscopic image may be any of a moving image or a still image. In addition, in each of first to sixth embodiments of the present disclosure, a description will be given by exemplifying a display device which provides a stereoscopic image when the stereoscopic image is viewed by the naked eye. In addition, as far as a method of presenting a stereoscopic image by the naked eye, in the following explanation, a description will be given by exemplifying a parallax barrier system (hereinafter suitably referred to as "a barrier system").

It is noted that each of the first to sixth embodiments of the present disclosure which will be described below can also be applied to a system other than the parallax barrier system, for example, a system using a lenticular screen, or the like. In addition, the present disclosure which will be described below can be applied to a system for generating a point of view through switching by using a liquid crystal or the like, a liquid crystal lens, or the like in addition to a light blocking barrier.

That is to say, by carrying out the sorting of the lights, the present disclosure can also be applied to a device for carrying out double screened display (multi-view display), stereoscopic display or the like.

Figure 1:
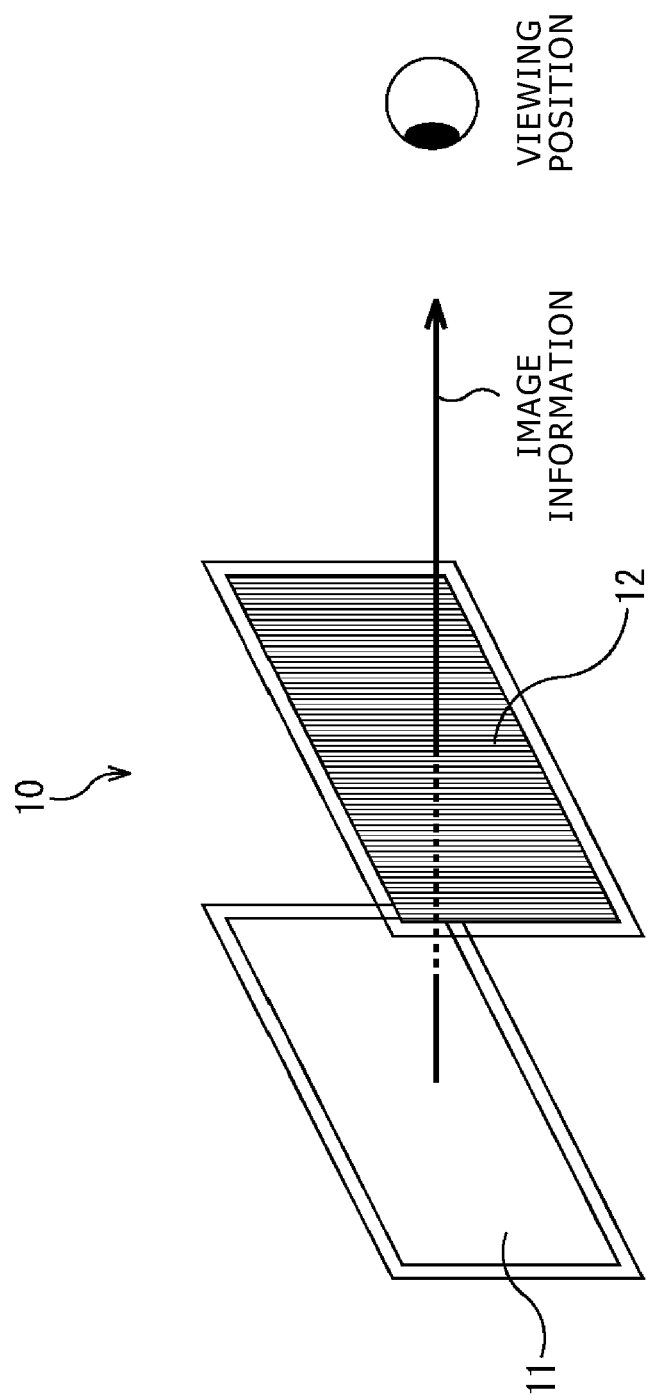
FIG. 1 is a view showing a structure of a display device of the present disclosure.

FIG. 1 is a view showing a detailed structure of a display portion, which displays thereon a stereoscopic image, of a display device 10 of the present disclosure. The display device 10 is composed of the display portion 11 and a parallax barrier 12. In this case, the display portion 11 displays thereon an image, a video image or the like. Also, the parallax barrier 12 is provided in the display portion 11 on a side of an observer. That is to say, the parallax barrier 12 having the same shape as that of the display portion 11 is mounted to the display surface of the display portion 11.

The parallax barrier 12 has vertical slits. The observer views an image displayed on the displayed portion 11 through the parallax barrier 12. A pixel for a left eye which displays an image seen from the left eye when viewed from a predetermined apparent place, and a pixel for a right eye which displays an image seen from the right eye are alternately arranged. It is noted that although in this case, a description will now be mainly given by exemplifying the case where a stereoscopic image is provided for the observer, since the present disclosure can also be applied to the case where different images are provided for plural observers, in other words, multi-view images are provided, a description will now be given by suitably exemplifying the case of the multi-view.

[With Respect to Parallax Barrier System]

Figure 2:
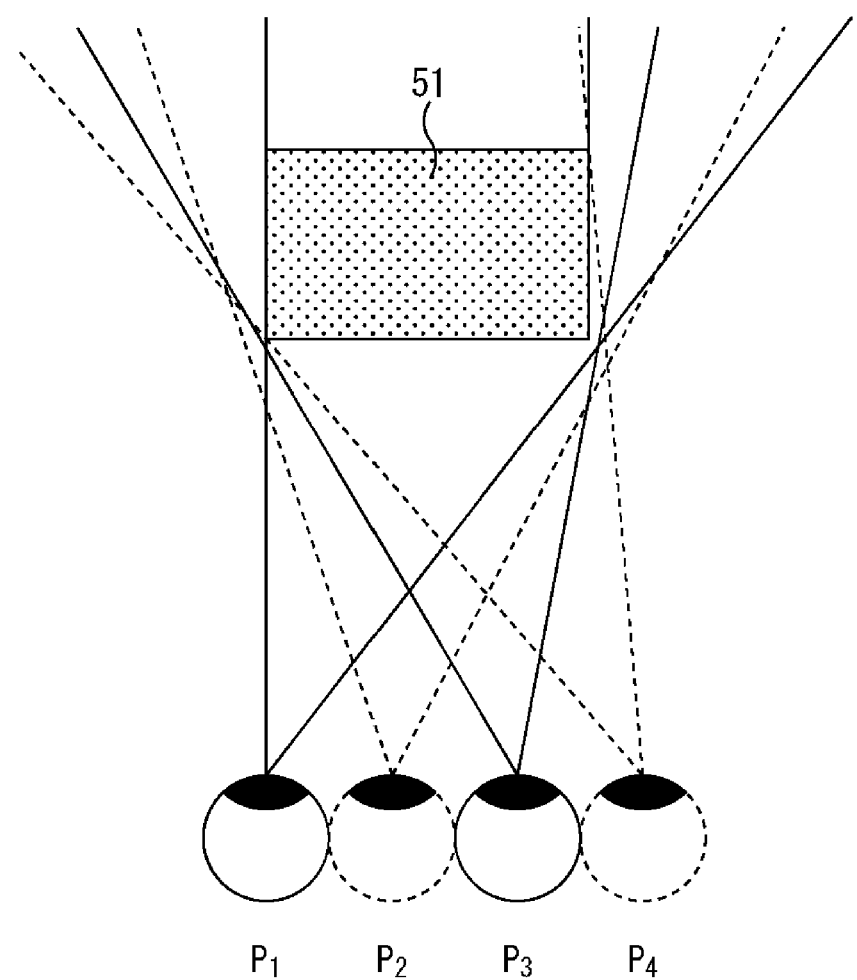
FIG. 2 is a view explaining a parallax barrier system.

Here, a description will now be given with respect to the parallax barrier system. FIG. 2 is a view explaining four points of views. In FIG. 2, the four points of view mean a point P1 of view, a point P2 of view, a point P3 of view, and a point P4 of view. How to view an object 51 differs in the individual points of view of the four points of view. Images in the respective points of view are displayed on the display portion 11.

When it is supposed that of the four points of view shown in FIG. 2, the point P1 of view is set as a point of view of the left eye, the point P3 of view becomes a point of view of the right eye. Therefore, since the human being normally sees the same object (the object 51 in this case) by the left eye and the right eye, preferably, an image when it is viewed from the point P1 of view, and an image when it is viewed from the point P3 of view are provided as an image for the observer. Likewise, when it is supposed that, of the four points of view shown in FIG. 2, the point P2 of view is set as a point of view of the left eye, the point P4 of view becomes a point of view of the right eye. Therefore, preferably, an image when it is viewed from the point P2 of view, and an image when it is viewed from the point P4 of view are provided as an image for the observer.

Figure 3:
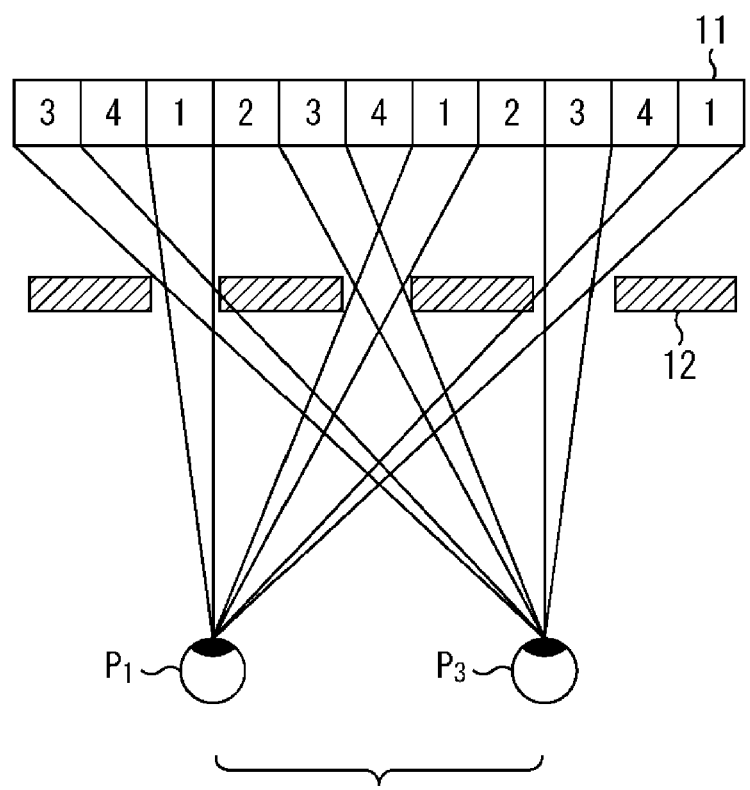
FIG. 3 is a view explaining a point of view.

In such a manner, when the images when they are viewed from plural points of view are provided for the observer, a combination of the images which the observer views at the same time is important. Thus, the control is carried out by both of the display portion 11 and the parallax barrier 12 so that the images having the proper combination are viewed by the observer. When although depending on an opening portion of the parallax barrier 12, the opening portion of the parallax barrier 12 has a straight line-like shape, parallax images corresponding to the number of points of view are alternately arranged in the display portion 11 so as to be vertically long cut. In FIGS. 2 and 3, the case where the display portion 11 and the like are viewed from the upper side is exemplified. As shown in FIG. 3, the parallax barrier 12 is installed on the near side of the display portion 12 (on the observer side).

Referring to FIG. 3, in the case when a point of view of the observer is located in a proper apparent place, when the left eye is located in the position of the point P1 of view, a parallax image 1 is viewed from the left eye. On the other hand, when the right eye is located in the position of the point P3 of view, a parallax image 3 is viewed from the right eye. In addition, in the case of the multiview, if the parallax image 1 is supplied to an observer 1, the parallax image 2 is supplied to an observer 2, the parallax image 3 is supplied to an observer 3, and the parallax image 4 is supplied to an observer 4, different images (video images) can be supplied to different observers.

[With Respect to Dual-Domain Structure]

Figure 4:
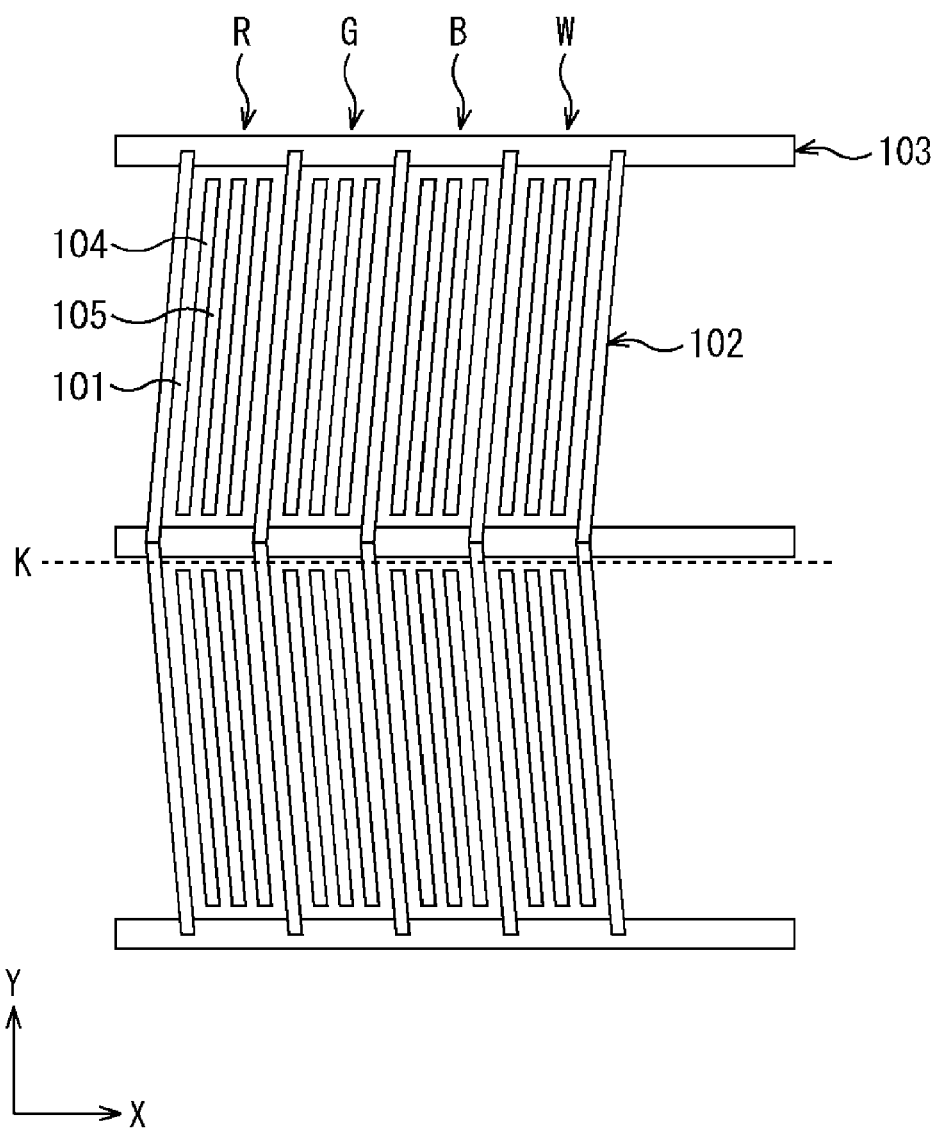
FIG. 4 is a view explaining a pixel having a dual-domain structure.

Next, a description will now be given with respect to an arrangement or the like of the pixels in the display portion 11. In the following, a description will be given by exemplifying the case where the display portion 11 is a color liquid crystal display portion complying with a Fringe-Field Switching (FFS) system. FIG. 4 is a top plan view showing a structure of one pixel in the display portion 11.

The display portion 11 in the present disclosure can be applied to a display device in which four sub pixels which output color lights of Red (R), Green (G), Blue (B), and White (W), respectively, compose one pixel. Here, a display area becoming a minimum unit composing the display is referred to as "a sub pixel," and a display area composed of one set of sub pixels (R, G, B, and W) is referred to as "a pixel." It is noted that in this specification, "a longitudinal direction of a sub pixel" is defined as a Y-axis direction in FIG. 4. In addition, "a transverse direction of a sub-pixel" is defined as an X-axis direction perpendicular to the Y-axis in FIG. 4.

Pixel electrodes 101 are respectively provided in plural sub pixels R, G, B, and W which are arranged in a matrix in the display area of the display portion 11. In addition, a Thin Film Transistor (TFT) element (not shown) as a switching element for carrying out conduction control for the pixel electrode 101 is connected to the pixel electrode 101. A data line 102 is electrically connected to a source terminal of the TFT element. Pixel signals S1, S2, . . . , Sn are supplied from a data line drive circuit (not shown) to the data lines 102, respectively.

A scanning line 103 is electrically connected to a gate terminal of the TFT element. Scanning signals G1, G2, . . . , Gm are supplied in the form of pulses at predetermined timings to the scanning lines 103, respectively. The scanning signals G1, G2, . . . , Gm are supplied to the scanning lines 103, respectively, in this order in a line sequential manner. The pixel electrode 101 is electrically connected to a drain terminal of the TFT element. Also, when the TFT elements as the switching elements are held in an ON state only for given periods of time by the scanning signals G1, G2, . . . , Gm supplied from the scanning lines 103, respectively, the pixel signals S1, S2, . . . , Sn supplied from the data lines 102 are written to liquid crystals of the pixels at predetermined timings, respectively.

The pixel signals S1, S2, . . . , Sn written to the liquid crystals are held in a liquid crystal capacitors defined between the pixel electrodes 101 and a common electrode (not shown) for given periods of time, respectively. When a voltage signal is applied to the liquid crystal, an alignment state of liquid crystal molecules is changed by a level of the applied voltage. As a result, a light made incident to the liquid crystal is modulated, thereby carrying out gradation display.

As shown in FIG. 4, the pixel electrode 101 provided every sub pixel R, G, B, W has a shape in which a rectangle is bent at a center of the longitudinal direction of the rectangle. Thus, both ends of a bent portion K are bent so as to be tilted oppositely to each other with respect to the longitudinal direction of the sub pixel R, G, B, W in such a way that an upper half of the sub pixel R, G, B, W in FIG. 4 is tilted from bottom left to top right, and a lower half is tilted from bottom right to top left.

In addition, plural slits (air gaps) 105 are formed inside the pixel electrode 101 so as to extend in the same direction as an extension direction of an outer edge of the pixel electrode 101. That is to say, each of the slits 105 is bent in such a way that an upper half of the sub pixel R, G, B, W in FIG. 4 is tilted in a direction from bottom left to top right, and a lower half of the sub pixel R, G, B, W in FIG. 4 is tilted in a direction from bottom right to top left, and thus both sides of the bent portion K are bent so as to be tilted reversely to each other with respect to the longitudinal direction of the sub pixel R, G, B, W. Both sides of the slit 105 become a line-like electrode 104.

In such a manner, one pixel shown in FIG. 4 has a structure to include the four sub pixels: the sub pixel R; the sub pixel G; the sub pixel B; and the sub pixel W. Also, each of the four sub pixels has the structure which is bent at the bent portion K. The sub pixels including such bent portions K are arranged in a matrix, thereby structuring the display portion 11. Also, the parallax barrier 12 is provided on such a display portion 11.

It is noted that although one pixel is composed of the four sub pixels: the sub pixel R; the sub pixel G; the sub pixel B; and the sub pixel W, in the case shown in FIG. 4, if two pixels which are located in an upper portion and a lower portion of the bent portion K, respectively, are described as an upper sub pixels and a lower sub pixel, respectively, one sub pixel is composed of the upper sub pixel and the lower sub pixel.

There are the case where the upper sub pixel and the lower sub pixel are structured integrally with each other and are also structured so as to have the same color, the case where the upper sub pixel and the lower sub pixel are structured separately from each other and are also structured so as to have the same color, and the case where the upper sub pixel and the lower sub pixel are structured separately from each other so as to have different colors. Although in the following description, the case where the upper sub pixel and the lower sub pixel are structured separately from each other and are described as the sub pixels, respectively, the present disclosure which will be described below can also be applied to the case where the upper sub pixel and the lower sub pixel are structured integrally with each other.

[With Respect to Relationship 1 Between Pixels and Barrier]

Next, a description will be given with respect to a relationship between the display portion 11 in which one pixel is composed of the four sub pixels as shown in FIG. 4, and the parallax barrier 12. In the following, a description will be continuously given by exemplifying the case as shown in FIG. 5, the display portion 11 corresponds to seven points of view. When the points of view from the point P1 of view to the point P7 of view exist in the order from the right-hand side as shown in FIG. 5, with regard to the pixels of the display portion 11, parallax images 1 to 7 are arranged in the order from the left-hand side.

Although the pixels of the display portion 11 are described in such a way that the parallax images 1 to 7 are arranged in the order from the left-hand side, this arrangement depends on what kind of opening shape the barrier has is used as the parallax barrier 12. Although details will be described later with reference to the drawings, for example, when a parallax barrier having a straight line-like shape is used as the parallax barrier 12, the parallax images are also arranged in a straight line-like shape. In addition, when a step-shaped parallax barrier is used as the parallax barrier 12, the parallax images are also arranged in a step-like shape.

Firstly, a description will now be given with respect to the arrangement or the like of the pixels (sub pixels) which supply an image to one point of view in the case where the step-shaped parallax barrier 12 (the parallax barrier which is referred to as a kind of step barrier) is used with reference to FIGS. 6A, 6B, and 6C.

The sub pixels are arranged in the manner as shown in FIG. 6A. In FIGS. 6A, 6B, and 6C and figures which will be used in the following description, it is supposed that the description as R represents the sub pixel R, the description as G represents the sub pixel G, the description as B represents the sub pixel B, and the description as W represents the sub pixel W.

In addition, a notation such as a sub pixel 1-2 is given as the notation representing a position of the sub pixel. In the notation as the sub pixel 1-2, "1" represents a first position when counting is carried out from the left-hand side in the X-axis direction (refer to FIG. 4), and "2" represents a second position when the counting is carried out from the upper side in the Y-axis direction (refer to FIG. 4). For example, the sub pixel 1-1 shows the sub pixel R which is located in a leftmost and uppermost position in FIG. 6A. Likewise, for example, the sub pixel 4-1 shows the sub pixel W which is located in a fourth position from the left-hand side in the uppermost position.

Such a notation is applied to the parallax barrier 12 as well. For example, a notation as an opening portion 1-4 of the parallax barrier 12 means an opening portion of the parallax barrier 12, that is, an opening portion which is opened in a position corresponding to the sub pixel 1-4. For example, in FIG. 6B, a notation as an opening portion 1-1 represents an opening portion which is located in a leftmost and uppermost position of the parallax barrier 12, and also an opening portion which exists in the position where the sub pixel 1-1 is located.

A description will now be continuously given on the assumption that such a notation also applies to other drawings.

In the pixel arrangement shown in FIG. 6A, one pixel is composed of the sub pixel R, the sub pixel G, the sub pixel B, and the sub pixel W which are arranged in this order in the transverse direction (in the X-axis direction). For example, one pixel is composed of the sub pixel R of the sub pixel 1-1, the sub pixel G of the sub pixel 2-1, the sub pixel B of the sub pixel 3-1, and the sub pixel W of the sub pixel 4-1.

In addition, the sub pixels 1-1 to 14-1 which are shown in the uppermost position in the figure are arranged so as to be tilted in a direction from bottom left to top right. Also, the sub pixels 1-2 to 14-2 which are shown in the second line from the top are arranged so as to be tilted in a direction from bottom right to top left. In the following, likewise, the sub pixels which are arranged so as to be tilted in a direction from bottom left to top right, and the sub pixels which are arranged so as to be tilted in a direction from bottom right to top left are alternately arranged.

FIG. 6B is a view showing an example of the parallax barrier 12. The parallax barrier 12 shown in FIG. 6B is the step barrier in which the opening portions are structured in a step-like shape. The step-like opening portions shown in FIG. 6B are provided in such a way that the opening portions are provided in the step-like shape, that is, the opening portion 2-2 is provided at the bottom right of the opening 1-1, the opening portion 3-3 is provided at the bottom right of the opening 2-2, and so forth.

Figure 7:
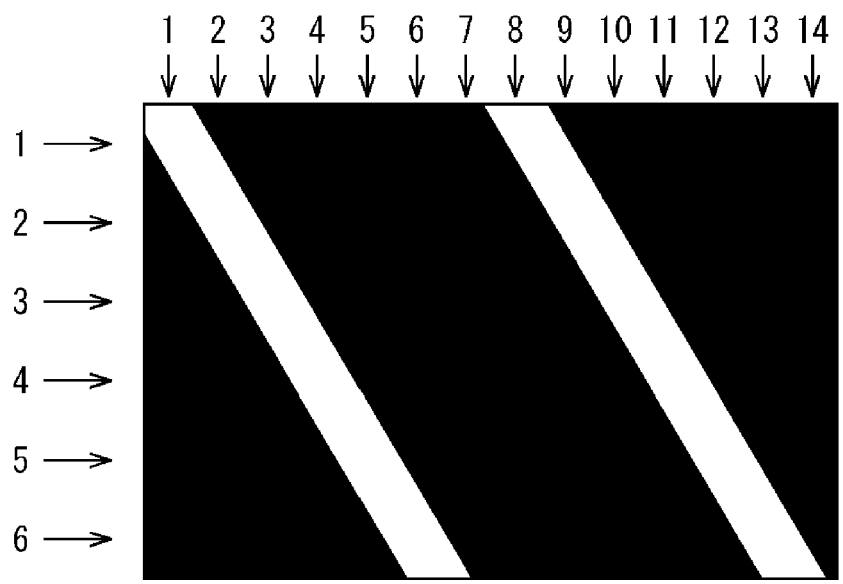
FIG. 7 is a view explaining another form of the parallax barrier.

Note that, in this case, as shown in FIG. 6B, there is shown the parallax barrier 12 in which quadrangles each corresponding to a size of the sub pixel are continuously provided in the step-like shape in an oblique direction. However, the parallax barrier 12 shown in FIG. 6B can be structured in the form of the parallax barrier 12 as shown in FIG. 7. The parallax barrier 12 shown in FIG. 7 is the parallax barrier 12 in which the opening portion is provided in the form of an oblique straight line, and thus the opening portions are provided in such a way that such oblique straight lines are continuously arranged in parallel with one another.

In the display device 10, the parallax barrier 12 shown in FIG. 6B is superposed on the pixels shown in FIG. 6A. FIG. 6C shows a state in which the parallax barrier 12 shown in FIG. 6B is superposed on the pixels shown in FIG. 6A. Referring now to FIG. 6C, the sub pixel R of the sub pixel 1-1 is seen through the opening portion 1-1 of the parallax barrier 12, and the sub pixel G of the sub pixel 2-2 is seen through the opening portion 2-2 of the parallax barrier 12. Also, the sub pixel B of the sub pixel 3-3 is seen through the opening portion 3-3 of the parallax barrier 12, and the sub pixel W of the sub pixel 4-4 is seen through the opening portion 4-4 of the parallax barrier 12. With regard to other opening portions as well, likewise, the structure is adopted such that the sub pixel arranged is seen through the opened portion.

When viewed from the predetermined one point of view, the light from the sub pixel as shown in FIG. 6C is provided for the observer. In such a manner, the opening portions are provided in the parallax barrier 12 shown in FIG. 6B in such a way that for the color balance of the image for each parallax, the sub pixels such as the sub pixels R, G, B, and W composing one pixel become equal to one another in the oblique direction.

Referring now to FIG. 6C again, of the sub pixels seen from the observer, for example, the sub pixel 1-1 and the sub pixel 9-2 are the sub pixels R of a red color, respectively. Also, the sub pixel 1-1 is the sub pixel which is included in the direction from bottom left to top right, and the sub pixel 9-2 is the sub pixel which is included in the direction from bottom right to top left. In this case, this arrangement means that the sub pixels which have the same color and which are tilted in the different directions are supplied to the same point of view. In other words, this arrangement means that the images from the sub pixels in the domains reverse to each other are supplied to the same point of view. Such a matter is similarly generated when attention is paid to any of the sub pixels of other colors.

In the case shown in FIG. 6C, the sub pixels of the same color which are located in the opening portions close to each other in the X-axis direction become the sub pixels in the domains reverse to each other.

In addition, when the sub pixels are viewed in the Y-axis direction, for example, the sub pixel R of the sub pixel 1-1, and the sub pixel R of the sub pixel 1-5 are both the sub pixels of the red color, and are also the sub pixels each tilted in the direction from bottom left to top right. With regard to other sub pixels as well, similarly, the sub pixels of the same color which are located in the opening portions close to each other in the Y-axis direction become the sub pixels in the domains in the same direction.

In such a manner, when within one point of view, the sub pixels of the same color close to each other in the X-axis direction are the sub pixels in the domains in the different directions, and the sub pixels of the same color close to each other in the Y-axis direction are the sub pixels in the domains in the same direction, it is possible that the streak, the cross talk, the Moire or the like is generated, and thus the optical characteristics are deteriorated.

First Embodiment

With Respect to First Parallax Barrier with which Optical Characteristics are not Deteriorated Hereinafter, a display device according to a first embodiment of the present disclosure will be described in detail with reference to FIGS. 8A, 8B, and 8C.

Then, a description will be given next with respect to a parallax barrier 12 with which the optical characteristics are not deteriorated in the case of the same arrangement of the sub pixels as that shown in FIG. 6A. Note that, in this case, a description will now be given by exemplifying the case where the parallax barrier 12 is changed in such a way that the optical characteristics are not deteriorated in the pixel arrangement on the assumption of the same arrangement of the sub pixels as that shown in FIG. 6A. However, the arrangement of the sub pixels can also be changed to such an arrangement that the optical characteristics of any of the sub pixels are not deteriorated without changing the openings (the design of the parallax barrier 12) of the parallax barrier 12. Such a case is also contained in an application scope of the present disclosure.

Figure 8C:
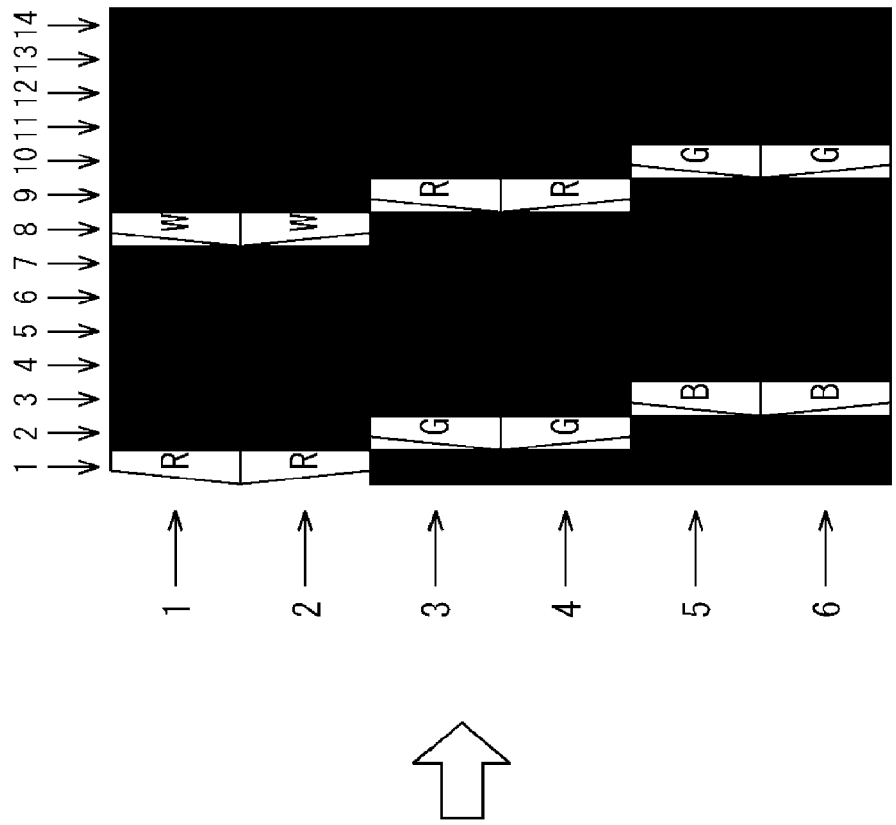
FIGS. 8A, 8B, and 8C are respectively views explaining a relationship between an arrangement of sub pixels, and a parallax barrier in a display device according to a first embodiment of the present disclosure.
Figure 8A:
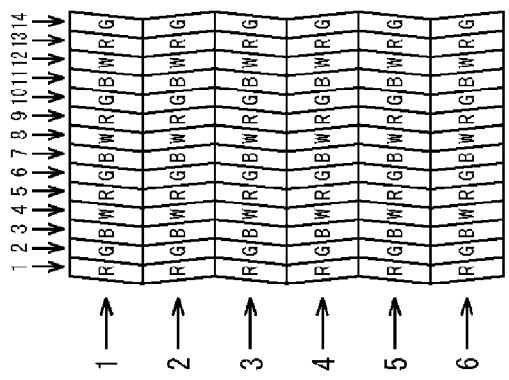
Figure 8B:
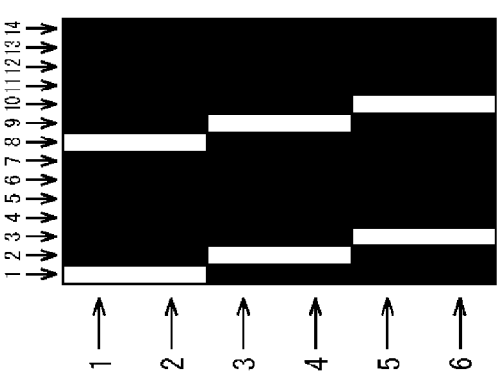

FIGS. 8A, 8B, and 8C are respectively views explaining an arrangement or the like of the pixels (sub pixels) which supply the images to one point of view when the step-shaped parallax barriers 12 are used. An arrangement of the sub pixels shown in FIG. 8A is the same as that of the sub pixel shown in FIG. 6A. When the parallax barrier 12 shown in FIG. 8B is provided for the display portion 11 composed of the sub pixels arranged in such a manner, the lights from the sub pixels as shown in FIG. 8C are provided for the observer.

A description will now be given with respect to the parallax barrier 12 shown in FIG. 8B. The parallax barrier 12 shown in FIG. 8B is structured in such a way that two sub pixels are included in one opening portion. For example, an opening portion 1-1 and an opening portion 1-2 are provided in the form of an opening portion in which the opening portion 1-1 and an opening portion 1-2 are continuously opened in the longitudinal direction (in the Y-axis direction). Likewise, an opening portion 2-3 and an opening portion 2-4 are also provided in the form of an opening portion which is continuously opened in the longitudinal direction, and an opening portion 3-5 and an opening portion 3-6 are also provided in the form of an opening portion which is continuously opened in the longitudinal direction.

The parallax barrier 12 is structured in a shape in which the opening portions each having such a size as to include two sub pixels are arranged in the step-like shape.

Referring now to FIG. 8C, the sub pixel R of the sub pixel 1-1 is located in the opening portion 1-1 of the parallax barrier 12, and the sub pixel R of the sub pixel 1-2 is located in the opening portion 1-2. Likewise, the sub pixel G of the sub pixel 2-3 is located in the opening portion 2-3 of the parallax barrier 12, and the sub pixel G of the sub pixel 2-4 is located in the opening portion 2-4. In any of other opening portions, likewise, two opening portions are continuously opened in such a way that two sub pixels of the same color are included therein.

That is to say, the opening portions of the parallax barrier 12 are provided in such a way that the sub pixels of the same color, that is, the sub pixels in the domains reverse to each other (the sub pixels having the different optical characteristics) are located in the two opening portions close to each other in the longitudinal direction, for example, in the opening portion 1-1 and the opening portion 1-2.

In addition, the opening portions of the parallax barrier 12 are provided in such a way that the sub pixels in the same domain (the sub pixels having the same optical characteristics) although they have the different colors are located in the two opening portions close to each other in the transverse direction, for example, in the opening portion 1-1 and the opening portion 8-1. Referring now to FIG. 8C, the direction of the domains of the sub pixels included in the longitudinal opening portion with the sub pixel R of the sub pixel 1-1 as a head, and the direction of the domains of the sub pixels included in the longitudinal opening portion with the sub pixel W of the sub pixel 8-1 as a head are identical to each other.

In such a manner, the display device 10 is structured in such a way that when as shown in FIG. 8A, there are the display portion 11 in which the pixels having the different optical characteristics are arranged, and the opening portions of the parallax barrier 12, as shown in FIG. 8B, which is arranged so as to face the display surface side of the display portion 11 and which causes the lights from the display portion 11 to pass in the predetermined direction, as shown in FIG. 8C, the pixels having the different optical characteristics and having the same color in the display portion 11, for example, the sub pixel R of the sub pixel 1-1, and the sub pixel R of the sub pixel 1-2 are located in the opening portion in which the opening portion 1-1 and the opening portion 1-2 are continuously provided.

In addition, the display device 10 is structured in such a way that the pixels of the display portion 11 have the dual-domain structure and, for example, the paired sub pixels having the different optical characteristics and having the same color, such as the sub pixel R of the sub pixel 1-1, and the sub pixel R of the sub pixel 1-2, are located in the opening portion in which the opening portion 1-1 and the opening portion 1-2 are continuously provided.

In such a manner, the colors of the domains which are different from one another in the longitudinal direction for one point of view can be provided for the observer, and the colors of the domains which are identical to one another in the transverse direction for one point of view can also be provided for the observer. That is to say, the sub pixels having the different optical characteristics can be equally arranged. As a result, it is possible to suppress the deterioration of the optical characteristics such as the streak, the cross talk or the Moire.

Second Embodiment

With Respect to Second Parallax Barrier with which Optical Characteristics are not Deteriorated Hereinafter, a display device according to a second embodiment of the present disclosure will be described in detail with reference to FIGS. 9A, 9B, and 9B.

Figure 9C:
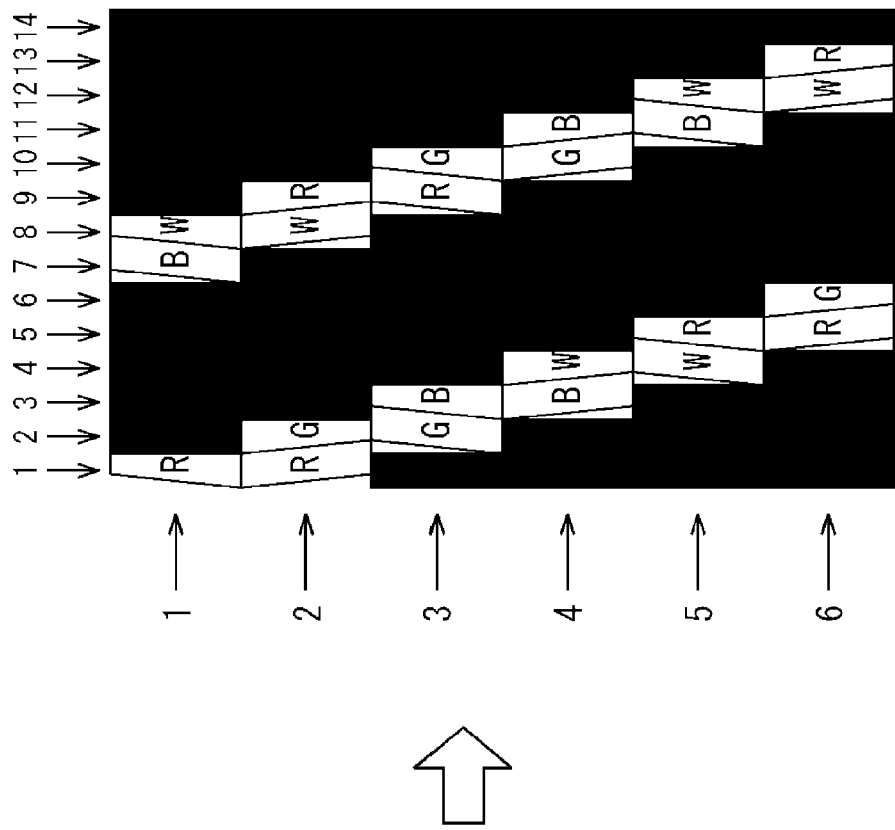
FIGS. 9A, 9B, and 9C are respectively views explaining a relationship between an arrangement of sub pixels, and a parallax barrier in a display device according to a second embodiment of the present disclosure.
Figure 9A:
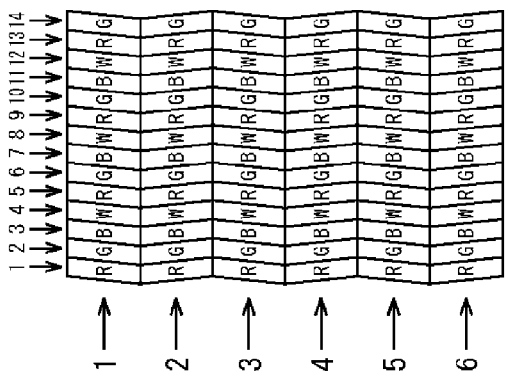
Figure 9B:
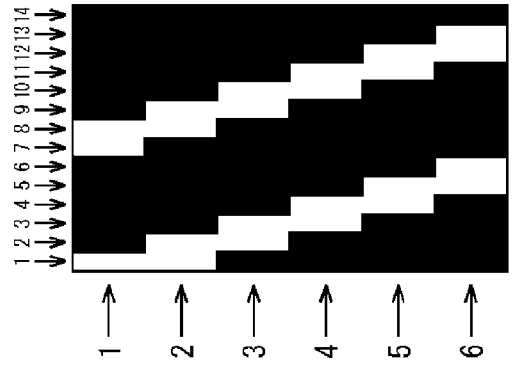

FIGS. 9A, 9B, and 9C are respectively views explaining another parallax barrier 12. In FIGS. 9A, 9B, and 9C as well, similarly to the case of FIGS. 8A, 8B, and 8C, the arrangement of the sub pixels shown in FIG. 9A is the same as that of the sub pixels shown in FIG. 6A. When the parallax barrier 12 shown in FIG. 9B is provided for the display portion 11 composed of the sub pixels arranged in such a manner, the lights from the sub pixels as shown in FIG. 9C are provided for the observer.

A description will now be given with respect to the parallax barrier 12 shown in FIG. 9B. Similarly to the case of the parallax barrier 12 shown in FIG. 8B, the parallax barrier 12 shown in FIG. 9B is also structured in such a way that two opening portions are continuously provided, and two sub pixels are included in the two opening portions thus continuously provided. For example, the opening portion 1-1 and the opening portion 1-2 are provided in the form of the opening portion which is continuously opened in the longitudinal direction (in the Y-axis direction). Likewise, the opening portion 2-2 and the opening portion 2-3 are also provided in the form of the opening portion which is continuously opened in the longitudinal direction, and the opening portion 3-3 and the opening portion 3-4 are also provided in the form of an opening portion which is continuously opened in the longitudinal direction.

The parallax barrier 12 shown in FIG. 9B, and the parallax barrier 12 shown in FIG. 8B agree with each other in that when the parallax barrier 12 shown in FIG. 9B, and the parallax barrier 12 shown in FIG. 8B are viewed from the longitudinal direction (from the Y-axis direction), the opening portions have such a size as to include two sub pixels. However, the parallax barrier 12 shown in FIG. 9B, and the parallax barrier 12 shown in FIG. 8B are different from each other in that although when the parallax barrier 12 shown in FIG. 9B, and the parallax barrier 12 shown in FIG. 8B are viewed from the transverse direction (from the X-axis direction), the parallax barrier 12 shown in FIG. 8B is composed of one opening portion and thus is composed as the opening portion including one sub pixel, the parallax barrier 12 shown in FIG. 9B is composed of two opening portions which are continuously opened, and thus is composed as the opening portion including two sub pixels.

For example, the opening portion 1-2 and the opening portion 2-2 are the opening portions close to each other in the transverse direction. Also, the sub pixel R of the sub pixel 1-2, and the sub pixel G of the sub pixel 2-2 are included in the opening portions which are continuously opened.

In such a manner, the sub pixels having the different optical characteristics can be equally arranged for one point of view even in the parallax barrier 12 shown in FIGS. 9A, 9B, and 9C and having the opening portions each having such a size as to include two sub pixels in the transverse direction as well as in the longitudinal direction similarly to the case of the parallax barrier 12 shown in FIGS. 8A, 8B, and 8C.

That is to say, the display device 10 is structured in such a way that when as shown in FIG. 9A, there are the display portion 11 in which the pixels having the different optical characteristics are arranged, and the opening portions of the parallax barrier 12, as shown in FIG. 9B, which is arranged so as to face the display surface side of the display portion 11 and which causes the lights from the display portion 11 to pass in the predetermined direction, as shown in FIG. 9C, the pixels having the different optical characteristics and having the same color in the display portion 11, for example, the sub pixel R of the sub pixel 1-1, and the sub pixel R of the sub pixel 1-2 are located in the opening portion in which the opening portion 1-1 and the opening portion 1-2 are continuously provided.

It is possible to suppress the deterioration of the optical characteristics such as the streak, the cross talk or the Moire owing to such a relationship between the arrangement of the sub pixels, and the opening portions of the parallax barrier 12.

[With Respect to Relationship Between Pixels and Barrier]

Next, a description will now be given with respect to a relationship between the display portion 11 in which one pixel is composed of four sub pixels, and the parallax barrier 12 with reference to FIGS. 10A, 10B, and 10C. In a description as well given with reference to FIGS. 10A, 10B, and 10C, the description will now be continuously given by exemplifying the case where as shown in FIG. 5, the display portion 11 corresponds to seven points of view.

In a pixel arrangement shown in FIG. 10A, one pixel is composed of the sub pixels which are arranged in the longitudinal direction (in the Y-axis direction). For example, one pixel is composed of the sub pixel R of the sub pixel 1-1, the sub pixel G of the sub pixel 1-2, the sub pixel B of the sub pixel 1-3, the sub pixel W of the sub pixel 1-4.

In addition, in these figures, the sub pixels 1-1 to 14-1 which are shown on the uppermost side are arranged so as to be tilted in the direction from bottom left to top right. Also, in these figures, the sub pixels 2-1 to 14-2 which are shown in the second line from the top are arranged so as to be tilted in the direction from bottom right to top left. In the following, likewise, the sub pixels which are arranged so as to be tilted in the direction from bottom left to top right, and the sub pixels which are arranged so as to be tilted in the direction from bottom right to top left are alternately arranged.

FIG. 10B is a view showing an example of the parallax barrier 12. The parallax barrier 12 shown in FIG. 10B is the barrier in which the opening portions are formed in a straight line-like shape. Since in the parallax barrier 12 shown in FIG. 10B, the opening portions 1-1 to 1-6 are continuously provided, the parallax barrier 12 shown in FIG. 10B is provided in the form of the parallax barrier in which the opening portions are linearly opened. Likewise, the opening portions 8-1 to 8-6 are continuously provided, whereby the opening portions which are linearly opened are provided in the parallax barrier 12. In such a manner, the parallax barrier 12 is provided in the form of the barrier in which the opening portions which are linearly opened are provided in parallel with one another.

It is noted that although in this case, the description will be continuously given below on the assumption that the opening portions are formed in a straight line-like shape in the parallax barrier 12, similarly to the case of the sub pixels it is also possible to adopt a shape in which the opening portions which are tilted either in the direction from bottom left to top right or in the direction from bottom right to top left are continuously provided. In other words, the opening portions of the parallax barrier 12 may be each formed in a V shape similarly to the case of the sub pixels, or may be formed in a parallel line as shown in FIG. 10B. Even in any of other figures, likewise, it is also possible to adopt the opening portions which agree in shape with the sub pixels.

The display device 10 is structured by superposing the parallax barrier 12 shown in FIG. 10B on the display portion 11 having the arrangement of the sub pixels shown in FIG. 10A. FIG. 10C shows a state in which the parallax barrier 12 shown in FIG. 10B is superposed on the display portion 11 having the arrangement of the sub pixels shown in FIG. 10A. Referring now to FIG. 10C, the sub pixel R of the sub pixel 1-1 is seen through the opening portion 1-1 of the parallax barrier 12, and the sub pixel G of the sub pixel 1-2 is seen through the opening portion 1-2 of the parallax barrier 12. Also, the sub pixel B of the sub pixel 1-3 is seen through the opening portion 1-3 of the parallax barrier 12, and the sub pixel W of the sub pixel 1-4 is seen through the opening portion 1-4 of the parallax barrier 12. With regard to other opening portions as well, likewise, the structure is adopted such that the sub pixel arranged is seen through the opened portion.

When viewed from the predetermined one point of view, the light from the sub pixel as shown in FIG. 10C is provided for the observer. In such a manner, the opening portions are provided in the parallax barrier 12 shown in FIG. 10B in such a way that for the color balance of the image for each parallax, the sub pixels such as the sub pixels R, G, B, and W composing one pixel become equal to one another in the longitudinal direction.

Referring to FIG. 10C again, of the sub pixels seen from the observer, for example, the sub pixel 1-1 and the sub pixel 8-4 are the sub pixels R of a red color, respectively. Also, the sub pixel 1-1 is the sub pixel which is tilted in the direction from bottom left to top right, and the sub pixel 8-4 is the sub pixel which is tilted in the direction from bottom right to top left. In this case, the sub pixels which have the same color and tilted in the different directions are supplied to the same point of view. In other words, this arrangement means the light from the sub pixels in the different domains are supplied to the same point of view.

In the case shown in FIG. 10C, the sub pixels of the same color which are located in the opening portions close to each other in the X-axis direction become the sub pixels in the domains reverse to each other.

When the sub pixels are viewed in the Y-axis direction (in the longitudinal direction), referring to FIG. 10C, for example, the sub pixel R of the sub pixel 1-1, and the sub pixel R of the sub pixel 1-5 are both the sub pixels of the red color, and are also the sub pixels each tilted in the direction from bottom left to top right. With regard to other sub pixels as well, similarly, the sub pixels of the same color become the sub pixels in the domains in the same direction.

Similarly to the case of the state shown in FIGS. 6A, 6B, and 6C, in such a state shown in FIGS. 10A, 10B, and 10C, the sub pixels of the same color close to each other in the X-axis direction are the sub pixels in the domains in the different directions, respectively, and the sub pixels of the same color close to each other in the Y-axis direction are the sub pixels in the domains in the same direction, respectively. In such a case, it is possible that the streak, the cross talk, the Moire or the like is generated, and thus the optical characteristics are deteriorated.

Third Embodiment

With Respect to Third Parallax Barrier with which Optical Characteristics are not Deteriorated Hereinafter, a display device according to a third embodiment of the present disclosure will be described in detail with reference to FIGS. 11A, 11B, and 11C.

Then, a description will be given below with respect to a parallax barrier 12 with which the optical characteristics are not deteriorated when the same arrangement of the sub pixels as that shown in FIG. 10B is used.

FIGS. 11A, 11B, and 11C are respectively views explaining an arrangement or the like of the pixels (sub pixels) which supply the images to one point of view when the straight line-shaped parallax barrier 12 is used. An arrangement of the sub pixels shown in FIG. 11A is the same as that of the sub pixels shown in FIG. 10A. When the parallax barrier 12 shown in FIG. 11B is provided for the display portion 11 composed of the sub pixels arranged in such a manner, the lights from the sub pixels as shown in FIG. 11C are provided for the observer.

A description will now be given with respect to the parallax barrier 12 shown in FIG. 11B. The parallax barrier 12 shown in FIG. 11B has the same shape as that of the parallax barrier 12 shown in FIG. 10B. However, the parallax barrier 12 shown in FIG. 11B is different from the parallax barrier 12 shown in FIG. 10B in that although the straight line-shaped opening portions with each of the opening portion 1-1 and the opening portion 1-8 as the head are provided in the parallax barrier 12 shown in FIG. 10B, the straight line-shaped opening portions with each of the opening portion 1-1 and the opening portion 1-9 as the head are provided in the parallax barrier 12 shown in FIG. 11B.

The opening portions are shifted by one line in such a manner, whereby as will be described below with reference to FIG. 11C, it is possible to prevent the optical characteristics from being deteriorated. Since this case corresponds to the case where the number of points of view is changed from seven points of view to eight points of view, in other words, the number of points of view is adjusted, whereby it is possible to prevent the optical characteristics from being deteriorated.

Referring now to FIG. 11C, the sub pixel R of the sub pixel 1-1 is located in the opening portion 1-1 of the parallax barrier 12, and the sub pixel R of the sub pixel 1-5 is located in the opening portion 1-5 which is located on the lower side in the longitudinal direction of the opening portion 1-1. The two sub pixels R are the sub pixels having the same characteristics, respectively. Likewise, the sub pixel G of the sub pixel 1-2 is located in the opening portion 1-2 of the parallax barrier 12, and the sub pixel G of the sub pixel 1-6 is located in the opening portion 1-6 which is provided in the same opening portion of the opening portion 1-1. The two sub pixels G are the sub pixels having the same characteristics, respectively.

In any of other opening portions as well, similarly, the sub pixels of the same color which are close to each other in the longitudinal direction are provided as the sub pixels having the same optical characteristics, respectively. That is to say, the opening portions of the parallax barrier 12 are provided in such a way that the sub pixels having the same color in the same domain (the sub pixels having the same optical characteristics) are located in the opening portions which are close to each other in the longitudinal direction. Therefore, the color in the same domain for one point of view in the longitudinal direction (in the direction in which the straight line-shaped opening portions are provided) can be provided for the observer.

In addition, when the sub pixels are viewed in the transverse direction (in the X-axis direction), the sub pixel R of the opening portion 1-1, and the sub pixel R of the opening portion 9-1 are the sub pixels which are tilted in the direction from the bottom left to top right, and also the sub pixels having the same characteristics. Likewise, the sub pixel G of the opening portion 1-2, and the sub pixel G of the opening portion 9-2 are the sub pixels which are tilted in the direction from the bottom right to top left, and also the sub pixels having the same characteristics. In any of other opening portions as well, similarly, the sub pixels of the same color which are close to each other in the transverse direction are provided as the sub pixels having the same optical characteristics, respectively.

That is to say, with regard to the sub pixels having the same color within the straight line-shaped opening portions which are close to each other in the transverse direction, the opening portions of the parallax barrier 12 are provided in such a way that the sub pixels in the same domain (the sub pixels having the same optical characteristics) are located. Therefore, the color in the same domain for one point of view can be provided for the observer.

The sub pixels are arranged in such a manner, and the opening portions of the parallax barrier 12 are provided, whereby, for example, in the case of the two parallaxes, the lights from the sub pixels having the same optical characteristics are supplied to the right eye and the left eye, respectively. As far as the characteristics of the eye of the human being, there are the characteristics such that although when the lights having the different characteristics enter the same eye, the human being feels strange, as long as the lights having the different characteristics enter the different eyes, respectively, the human being is hard to see that the lights having the different characteristics enter the different eyes, respectively. Therefore, even when the optical characteristics for the left eye, and the optical characteristics for the right eye are different from each other, the observer is hard to see this difference, and thus it is expected that this does not lead to the deterioration of the image quality.

From such a reason, the pixel arrangement and the parallax barrier 12 as shown in FIGS. 11A, 11B, and 11C are used, whereby only the lights from the pixels having the same optical characteristics can be supplied to the same eye.

That is to say, the display device 10 is structured in such a way that when as shown in FIG. 11A, there are the display portion 11 in which the pixels having the different optical characteristics are arranged, and the opening portions of the parallax barrier 12, as shown in FIG. 11B, which is arranged so as to face the display surface side of the display portion 11 and which causes the lights from the display portion 11 to pass in the predetermined direction, as shown in FIG. 11C, the opening portion 1-1 and the opening portion 9-1 are respectively provided in such positions where the parallax image supplied to the predetermined point of view is structured from the pixels having the same optical characteristics in the display portion 11, for example, the sub pixel R of the sub pixel 1-1, and the sub pixel R of the sub pixel 9-1.

By having such a structure, it is possible to suppress the deterioration of the optical characteristics such as the streak, the cross talk or the Moire.

[With Respect to Other Pixel Shapes]

For example, referring to FIG. 11A, the sub pixels shown in FIG. 4 to FIGS. 11A, 11B, and 11C have been illustrated and described as the pixels which are long in the longitudinal direction. However, this does not mean that the present disclosure is applied only to the pixels which are long in the longitudinal direction, but the present disclosure can be applied to the pixels as well which are long in the transverse direction as shown in FIG. 12.

Figure 12:
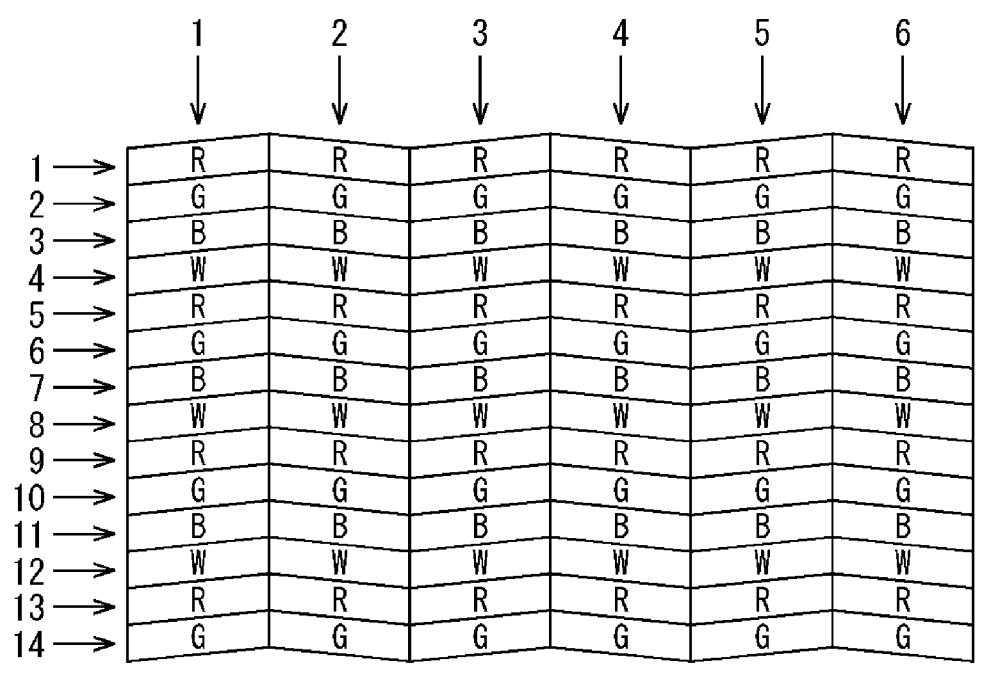

As far as the arrangement of the sub pixels shown in FIG. 12, the sub pixels are provided in the form of the sub pixels which are long in the transverse direction. Also, the sub pixel R, the sub pixel G, the sub pixel B, and the sub pixel W which compose one pixel are arranged in the longitudinal direction. Although not illustrated, in the case as well of such sub pixels each having the long shape in the transverse direction, for example, as previously described with reference to FIGS. 6A, 6B, and 6C or FIGS. 10A, 10B, and 10C, it is possible that the streak, the cross talk, the Moire or the like is generated, and thus the optical characteristics are deteriorated due to the positions and shapes of the opening portions of the parallax barrier 12.

However, as previously described with reference to FIGS. 8A, 8B, and 8C, FIGS. 9A, 9B, and 9C, or FIGS. 11A, 11B, and 11C, the positions and shapes of the opening portions of the parallax barrier 12 are suitably provided, whereby it is possible to prevent the optical characteristics from being deteriorated. In this case, a description of the parallax barrier 12 in the case of the sub pixels each having the long shape in the transverse direction shown in FIG. 12 is omitted here because the case previously described with reference to FIGS. 8A, 8B, and 8C, FIGS. 9A, 9B, and 9C, or FIGS. 11A, 11B, and 11C can be applied to such a parallax barrier 12. In addition, although in the following as well, a description will be given by exemplifying the case where each of the sub pixels has the long shape in the longitudinal direction, the present disclosure can be similarly applied to the case as well where each of the sub pixels has the long shape in the transverse direction.

[With Respect to Relationship 3 Between Pixels and Barrier]

Next, a description will now be given with respect to a relationship between the display portion 11 in which one pixel is composed of the four sub pixels, and the parallax barrier 12 with reference to FIGS. 13A, 13B, and 13C. In a description as well given with reference to FIGS. 10A, 10B, and 10C, the description will now be continuously given by exemplifying the case where the display portion 11 corresponds to the three points of view.

In a pixel arrangement shown in FIG. 13A, one pixel is composed of the four sub pixels which are arranged in a matrix of 2×2. For example, one pixel is composed of the sub pixel R of the sub pixel 1-1, the sub pixel G of the sub pixel 2-1, the sub pixel W of the sub pixel 1-2, the sub pixel B of the sub pixel 2-2. Referring now to FIG. 13A, the four sub pixels composing one pixel are arranged so as to be tilted in the direction from bottom left to top right.

In the figures, the sub pixels 1-1 to 8-1 shown in the top, and the sub pixels 1-2 to 8-2 shown in the second line from the top are arranged so as to be tilted in the direction from bottom left to top right. Also, the sub pixels 1-3 to 8-3 shown in the third line from the top, and the sub pixels 1-4 to 8-4 shown in the fourth line from the top are arranged so as to be tilted in the direction form bottom right to top left. In the following, similarly, the sub pixels which are arranged so as to be tilted in the direction from bottom left to top right, and the sub pixels which are arranged so as to be tilted in the form of bottom right to top left are alternately arranged every two columns.

FIG. 13B is a view showing an example of the parallax barrier 12. The parallax barrier 12 shown in FIG. 13B is the barrier in which the openings are provided in a straight line-like shape, and the shape thereof, for example, is the same as that of the parallax barrier 12 shown in FIG. 11B. The parallax barrier 12 shown in FIG. 13B is provided in the form of the parallax barrier in which the opening portions are linearly opened because the opening portions 1-1 to 1-8 are continuously provided. Likewise, the opening portions 4-1 to 4-8 are continuously provided, whereby the opening portions which are linearly opened are provided in the parallax barrier 12. In such a manner, the parallax barrier 12 is provided in the form of the barrier in which the straight line-like openings are provided in parallel with one another.

The display device 10 is structured by superposing the parallax barrier 12 shown in FIG. 13B on the display portion 11 having the arrangement of the sub pixels shown in FIG. 13A. FIG. 13C shows a state in which the parallax barrier 12 shown in FIG. 13B is superposed on the display portion 11 having the arrangement of the sub pixels shown in FIG. 13A. Referring now to FIG. 13C, the sub pixel R of the sub pixel 1-1 is seen through the opening portion 1-1 of the parallax barrier 12, and the sub pixel W of the sub pixel 1-2 is seen through the opening portion 1-2 of the parallax barrier 12. Also, the sub pixel G of the sub pixel 1-3 is seen through the opening portion 1-3 of the parallax barrier 12, and the sub pixel B of the sub pixel 1-4 is seen through the opening portion 1-4 of the parallax barrier 12. With regard to any of other opening portions as well, likewise, the structure is adopted such that the sub pixel arranged is seen through the opened portion.

Referring now to FIG. 13C, of the sub pixels within the opening portions which are close to each other in the transverse direction, for example, the sub pixel 1-1 and the sub pixel 4-3 are respectively the sub pixels R of the red color. Of the two sub pixels 1-1 and 4-3, the sub pixel 1-1 is the sub pixel which is tilted in the direction from bottom left to top right, and the sub pixel 4-3 is the sub pixel which is tilted in the direction from bottom right to top left. This relationship means that the lights are supplied from the sub pixels in the domains reverse to each other to the same point of view. Such a situation is similarly generated even when attention is paid to any of other sub pixels of other colors.

In the case shown in FIG. 13C, the sub pixels of the same color which are located in the opening portions close to each other in the X-axis direction become the sub pixels in the domains reverse to each other.

When the sub pixels within the opening portion which are continuously arranged in the Y-axis direction are viewed, for example, the sub pixel R of the sub pixel 1-1, and the sub pixel R of the sub pixel 1-5 are both the sub pixels of the red color, and are also the sub pixels which are tilted in the direction from bottom left to top right. With regard to any of other sub pixels as well, similarly, the sub pixels of the same color which are included in the same opening portion become the sub pixels in the domains in the same direction.

Similarly to the case of the state shown in FIGS. 6A, 6B, and 6C, in such a state shown in FIGS. 13A, 13B, and 13C, the sub pixels of the same color close to each other in the X-axis direction are the sub pixels in the domains in the different directions, and the sub pixels of the same color close to each other in the Y-axis direction are the sub pixels in the domains in the same direction in one point of view. In such a case, it is possible that the streak, the cross talk, the Moire or the like is generated, and thus the optical characteristics are deteriorated.

Fourth Embodiment

With Respect to Fourth Parallax Barrier (Pixel Arrangement) with which Optical Characteristics are not Deteriorated Hereinafter, a display device according to a fourth embodiment will be described in detail with reference to FIGS. 14A, 14B, and 14C.

Then, a description will be given below with respect to an arrangement (shapes) of the sub pixels with which the optical characteristics are not deteriorated when the same parallax barrier 12 as that shown in FIG. 13B is used.

Figure 14A:
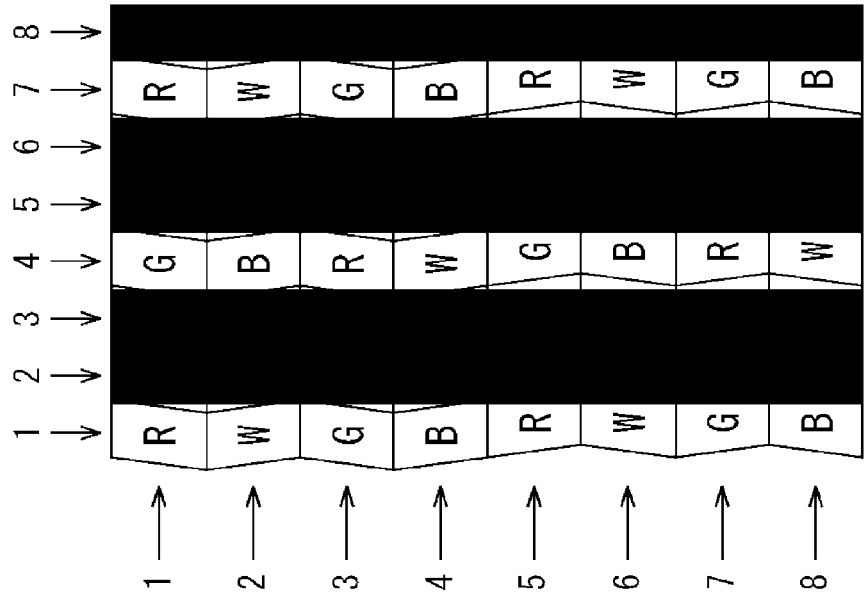
FIGS. 14A, 14B, and 14C are respectively views explaining a relationship between an arrangement of sub pixels, and a parallax barrier in a display device according to a fourth embodiment of the present disclosure.
Figure 14B:
Figure 14C:
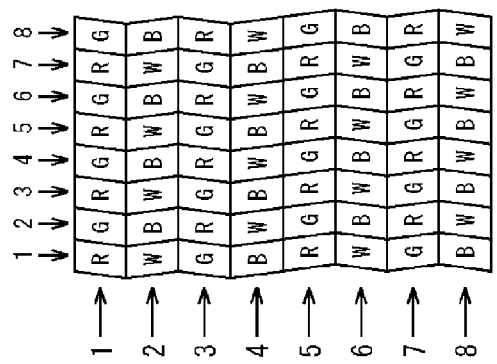

FIGS. 14A, 14B, and 14C are respectively views explaining an arrangement or the like of the pixels (sub pixels) which supply the images to one point of view when the straight line-shaped parallax barrier 12 is used. Although an arrangement of the sub pixels composing one pixel and shown in FIG. 14A is the same as that of the sub pixels composing one pixel and shown in FIG. 13A, these arrangements are different from each other in the direction in which the sub pixels are tilted.

In the arrangement of the sub pixels shown in FIG. 14A, similarly to the case of the arrangement of the sub pixels shown in FIG. 13A, one pixel is composed of four sub pixels which are arranged in a matrix of 2×2. For example, one pixel is composed of the sub pixel R of the sub pixel 1-1, the sub pixel G of the sub pixel 2-1, the sub pixel W of the sub pixel 1-2, and the sub pixel B of the sub pixel 2-2.

However, the arrangement of the sub pixels shown in FIG. 14A is different from the arrangement of the sub pixels shown in FIG. 13A in that of these four sub pixels, the sub pixel R of the sub pixel 1-1, and the sub pixel G of the sub pixel 2-1 are tilted in the direction from bottom left to top right, and the sub pixel W of the sub pixel 1-2, and the sub pixel B of the sub pixel 2-2 are tilted in the direction from bottom right to top left.

Although the arrangement of the sub pixels shown in FIG. 13A is carried out in such a way that the direction of the domain is changed every two rows, the arrangement of the sub pixels shown in FIG. 14A is based on that the direction of the domain is changed every one row, and partially, the directions of the domains are made identical to each other in two rows.

That is to say, the sub pixels shown in FIG. 14A are arranged in such a way that the sub pixels belonging to the first row are tilted in the direction from bottom left to top right, the sub pixels belonging to the second row are tilted in the direction from bottom right to top left, the sub pixels belonging to the third row are tilted in the direction from bottom left to top right, the sub pixels belonging to the fourth row are tilted in the direction from bottom right to top left, the sub pixels belonging to the fifth row are tilted in the direction from bottom right to top left, the sub pixels belonging to the sixth row are tilted in the direction from bottom left to top right, the sub pixels belonging to the seventh row are tilted in the direction from bottom right to top left, and the sub pixels belonging to the eighth row are tilted in the direction from bottom left to top right.

When the parallax barrier 12 shown in FIG. 14B is provided for the display portion 11 composed of the sub pixels arranged in such a manner, the lights from the sub pixels as shown in FIG. 14C are provided for the observer. The parallax barrier 12 shown in FIG. 14B has the same shape as that of the parallax barrier 12 shown in FIG. 13B.

Referring now to FIG. 14C, the sub pixel R of the sub pixel 1-1 is located in the opening portion 1-1 of the parallax barrier 12, and the sub pixel R of the sub pixel 1-5 is located in the opening portion 1-5 which is continuously provided in the longitudinal direction in the opening portion 1-1. The two sub pixels R are the sub pixels having the different characteristics (the sub pixels of the dominants in the different directions), respectively. Although in the case shown in FIG. 13C, the two sub pixels R are the sub pixels having the same characteristics, respectively, the sub pixels are arranged in the manner as described with reference to FIG. 14A, thereby arranging the sub pixels having the different characteristics, respectively.

Likewise, the sub pixel W of the sub pixel 1-2 is located in the opening portion 1-2 of the parallax barrier 12, and the sub pixel W of the sub pixel 1-6 is located in the opening portion 1-6 which is provided on the lower side of the opening portion 1-2. The two sub pixels W are provided in the form of the sub pixels having the different characteristics, respectively, because the two sub pixels W are located in the domains in the different directions, respectively.

In any of other opening portions as well, similarly, the sub pixels of the same color which are close to each other in the longitudinal direction are provided in the form of the sub pixels having the different optical characteristics. That is to say, the opening portions of the parallax barrier 12 are provided in such a way that the sub pixels of the same color close to each other in the longitudinal direction in the domains reverse to each other (the sub pixels having the different optical characteristics) are located in the opening portions which are close to each other in the longitudinal direction. Therefore, the sub pixels having the same color in the different domains in the longitudinal direction can be provided for the observer in the state in which the sub pixels concerned are mixed with one another for one point of view.

When the sub pixels are viewed from the transverse direction (from the X-axis direction), the sub pixel R of the opening portion 1-1, and the sub pixel R of the opening portion 4-3 are both the sub pixels which are tilted in the direction from bottom left to top right, and are also the sub pixels having the same characteristics. Likewise, the sub pixel W of the opening portion 1-2, and the sub pixel W of the opening portion 4-4 are both the sub pixels which are tilted in the direction from bottom right to top left, and are also the sub pixels having the same characteristics.

In addition, the sub pixel R of the opening portion 1-5, and the sub pixel R of the opening portion 4-3 are the sub pixel which is tilted in the direction from bottom right to top left, and the sub pixel which is tilted in the direction from bottom left to top right, respectively, and are the sub pixels having the different characteristics, respectively.

In any of other opening portions as well, similarly, the sub pixels of the same color which are close to each other in the transverse direction are provided in the form of either the sub pixels having the same characteristics or the sub pixels having the different characteristics. That is to say, the opening portions of the parallax barrier 12 are provided in such a way that as far as the sub pixels of the same color which are close to each other in the transverse direction, the sub pixels in the same domain (the sub pixels having the same optical characteristics) and the sub pixels in the different domains (the sub pixels having the different optical characteristics) are uniformly mixed with each other.

That is to say, the display device 10 is structured in such a way that when as shown in FIG. 14A, there are the display portion 11 in which the pixels having the different optical characteristics are arranged, and the opening portions of the parallax barrier 12, as shown in FIG. 14B, which are arranged so as to face the display surface side of the display portion 11 and which cause the lights from the display portion 11 to pass in the predetermined direction, as shown in FIG. 14C, the pixels having the different optical characteristics and having the same color in the display portion 11, for example, the sub pixel R of the sub pixel 1-1, and the sub pixel R of the sub pixel 1-5 are provided in a mixed manner within the opening portions (slits) in the longitudinal direction with the opening portion 1-1 as the head.

Such an arrangement of the sub pixels (the arrangement in which the directions of the domains are taken into consideration) is adopted, whereby it is possible to suppress the deterioration of the optical characteristics such as the streak, the cross talk or the Moire.

[With Respect to Relationship 4 Between Pixels and Barrier]

In the case where the display portion 11 is a liquid crystal display unit in which a liquid crystal material is sealed or the like, in the display portion 11, a predetermined gap is held between two sheets of substrates, and the liquid crystal material is sealed between the two sheets of substrates. Also, a spacer is provided in order to hold the gap between the two sheets of substrates. The optical characteristics are different between the sub pixel in which the spacer exists, and the sub pixel in which no spacer exists.

Then, it is also necessary to take the spacer into consideration. A description will now be given with respect to a relationship among the spacers, the pixels, and the parallax barrier with reference to FIGS. 15A, 15B, and 15C. It is noted that the description given with reference to FIGS. 15A, 15B, and 15C, and FIGS. 16A, 16B, and 16C will now be given by exemplifying the case where one pixel is composed of three sub pixels. That is to say, as shown in FIG. 15A, for example, one pixel is composed of three sub pixels: the sub pixel R of the sub pixel 1-1; the sub pixel G of the sub pixel 2-1; and the sub pixel B of the sub pixel 3-1. In FIG. 15A, the sub pixels of the same color are arranged in the longitudinal direction, and are also arranged in a state free from the tilt.

In FIG. 15A, a small black quadrangle indicates the spacer. The spacers are respectively provided in the upper sides within the sub pixels: the sub pixel R of the sub pixel 1-1; the sub pixel R of the sub pixel 1-13; the sub pixel R of the sub pixel 4-4; the sub pixel R of the sub pixel 7-7. The sub pixel has such a shape that a part of the sub pixel is cut out, which, for example, results in different optical characteristics such that a luminance is reduced as compared with any of other sub pixels.

Although in this case, the spacer is exemplified, it is possible that a part of the sub pixel is subjected to the light blocking due to the adjustment of the whiteness degree, or the distribution of the circuits such as the transistor circuits in addition to the provision of the spacers. There is a difference in the optical characteristics such as the luminance between the sub pixel which is subjected to the light blocking in such a manner, and the sub pixel free from the light blocking. For example, sine the spacer is present in the sub pixel R of the sub pixel 1-1, and the spacer is absent in the sub pixel R of the sub pixel 1-2, the two sub pixels R have the different optical characteristics in spite of the same color.

FIG. 15B is a view showing an example of the parallax barrier 12. The parallax barrier 12 shown in FIG. 15B is the step barrier in which the opening portions are provided in the step-like shape. One opening portion has such a size as to include three sub pixels. For example, the opening portion 1-1, the opening portion 2-1, and the opening portion 3-1 are provided in the form of one continuous opening portion concerned. Under the opening portion, the opening portion having the same size as that of the opening portion concerned is provided so as to be shifted to the right-hand side by one sub pixel.

The parallax barrier 12 in this case is provided in the form of the parallax barrier in which the opening portions each having such a size as to include three sub pixels are provided in the step-like shape. When such a parallax barrier 12 is provided on the display portion 11 having the arrangement of the sub pixels shown in FIG. 15A, as shown in FIG. 15C, the lights from the sub pixels are supplied to the observer.

Referring now to FIG. 15C, the sub pixel R of the sub pixel 1-1 is seen through the opening portion 1-1 of the parallax barrier 12, the sub pixel G of the sub pixel 2-1 is seen through the opening portion 2-1 of the parallax barrier 12, and the sub pixel B of the sub pixel 3-1 is seen through the opening portion 3-1 of the parallax barrier 12. In this opening portion, the spacer exists in the sub pixel R of the sub pixel 1-1. The sub pixels R in each of which the spacer exists are provided in other opening portions (the opening portions provided obliquely in the direction from top left to bottom right) which are provided in the step-like shape with that opening portion concerned as the head.

On the other hand, the sub pixel R of the sub pixel 7-1 is seen through the opening portion 7-1 of the parallax barrier 12, the sub pixel G of the sub pixel 8-1 is seen through the opening portion 8-1 of the parallax barrier 12, and the sub pixel B of the sub pixel 9-1 is seen through the opening portion 9-1 of the parallax barrier 12. In the opening portion concerned, the spacer is absent in the sub pixel R of the sub pixel 7-1. In addition, the sub pixel R in which the spacer exists is absent in any of other opening portions which are provided in the step-like shape with the opening portion concerned as the head.

In such a manner, the opening portion in which the spacer is provided, and the opening portion in which no spacer is provided exist with respect to the predetermined colors within the opening portions which are provided in the oblique direction. As previously described, the optical characteristics are different between the sub pixel in which the spacer exists, and the subs pixel in which no spacer exists. Therefore, in this case, the optical characteristics differ every opening portion.

In such a case, when the optical characteristics of the sub pixels within the opening portions which are arranged in the oblique direction so as to be close to one another in the X-axis direction are different from one another, it is possible that the oblique streak floats and thus the display image quality is reduced.

Fifth Embodiment

With Respect to Fifth Parallax Barrier (Arrangement of Spacers) with which Optical Characteristics are not Deteriorated Hereinafter, a display device according to a fifth embodiment of the present disclosure will be described in detail with reference to FIGS. 16A, 16B, and 16C.

Then, a description will now be given with respect to an arrangement (shapes) of the spacers with which the optical characteristics are not deteriorated when the same parallax barrier 12 as that shown in FIG. 15B is used.

FIGS. 16A, 16B, and 16C are respectively views explaining an arrangement or the like of the spacers in the pixels (sub pixels) which supply an image to one point of view when the step-shaped parallax barrier 12 is used. The arrangement of the sub pixels shown in FIG. 16A is the same as that of the sub pixels shown in FIG. 15A except that the positions of the spacers are different from those of the spacers in the arrangement of the sub pixels shown in FIG. 15A. The spacers are respectively provided on the upper sides within the sub pixels: the sub pixel 1-1; the sub pixel 4-3; the sub pixel 10-4; the sub pixel 7-5; and the sub pixel 13-6. Also, the spacer is provided on the lower side as well of the sub pixel R of the sub pixel 1-7.

When the parallax barrier 12 shown in FIG. 16B is provided on the display portion 11 in which such spacers and sub pixels are arranged, the lights from the sub pixels as shown in FIG. 16C are supplied to the observer. The parallax barrier 12 shown in FIG. 16B has the same shape as that of the parallax barrier 12 shown in FIG. 15B.

Referring now to FIG. 16C, the sub pixel R of the sub pixel 1-1 is seen through the opening portion 1-1 of the parallax barrier 12, and the sub pixel G of the sub pixel 2-1 is seen through the opening portion 2-1 of the parallax barrier 12, and the sub pixel B of the sub pixel 3-1 is seen through the opening portion 3-1 of the parallax barrier 12. In this opening portion, the spacer exists in the sub pixel R of the sub pixel 1-1. The sub pixels R in which the spacers exists, respectively, are provided in other opening portions as well (the opening portions which are provided obliquely in the direction from top left to bottom right) which are provided in the step-like shape with that opening portion concerned as the head.

Likewise, the sub pixel R of the sub pixel 7-1 is seen through the opening portion 7-1 of the parallax barrier 12, the sub pixel G of the sub pixel 8-1 is seen through the opening portion 8-1 of the parallax barrier 12, and the sub pixel B of the sub pixel 9-1 is seen through the opening portion 9-1 of the parallax barrier 12. In this opening portions concerned, no spacer exists in the sub pixel R of the sub pixel 7-1. However, the spacer exists in any of other opening portions which are provided in the step-like shape with this opening portions concerned as the head, for example, in the sub pixel R of the sub pixel 10-4 which is located in the position of the opening portion 10-4.

In such a manner, there is provided a state in which the spacer is provided in at least one sub pixel included in the opening portion (for example, described as "the slit") which is continuously provided in the oblique direction. In other words, the spacers are arranged in such a way that the sub pixels in which the spacers are necessarily provided exist within all of the slits, respectively. Therefore, the optical characteristics within all of the slits can be made identical to one another.

In the case shown in FIGS. 16A, 16B, and 16C, it is possible to prevent that when the optical characteristics of the sub pixels within the opening portions which are arranged in the oblique direction so as to be close to one another in the X-axis direction are different from one another, the oblique streak floats and thus the display image quality is reduced as previously described with reference to FIGS. 15A, 15B, and 15C.

In other words, the display device 10 is structured in such a way that when as shown in FIG. 16A, there are the display portion 11 in which the pixels having the different optical characteristics are arranged, and the opening portions of the parallax barrier 12, as shown in FIG. 16B, which are arranged so as to face the display surface side of the display portion 11 and which cause the lights from the display portion 11 to pass in the predetermined direction, as shown in FIG. 16C, the pixels having the different optical characteristics and having the same color in the display portion 11, for example, the sub pixel R of the sub pixel 1-1, and the sub pixel R of the sub pixel 4-2 are provided in a mixed manner within the opening portions (slits) which are arranged in the step-like shape in the longitudinal direction with each of the opening portions 1-1 to 3-1 as the head.

In addition, the display device 10 is structured in such a way that the sub pixels, having the different optical characteristics, such as the sub pixel R of the sub pixel 1-1, and the sub pixel R of the sub pixel 7-1, and the sub pixels, having the same optical characteristics, such as the sub pixel R of the sub pixel 1-1, and the sub pixel R of the sub pixel 10-4 are also respectively equally arranged in the different slits, for example, the longitudinal slits which are arranged in the step-like shape with each of the opening portions 1-1 to 3-1 as the head, and the longitudinal slits which are arranged in the step-like shape with each of the opening portions 7-1 to 9-1 as the head.

Sixth Embodiment

With Respect to Sixth Parallax Barrier (Arrangement of Spacers) with which Optical Characteristics are not Deteriorated Hereinafter, a display device according to a sixth embodiment of the present disclosure will be described in detail with reference to FIGS. 17A and 17B.

Then, a description will be given with respect to the parallax barrier 12 in which a difference in optical characteristics between the sub pixel having the spacer provided therein, and the sub pixel having no spacer provided therein is taken into consideration. FIGS. 17A and 17B are respectively views explaining the optical characteristics when the parallax barrier 12 having the straight line-shaped opening portions is mounted to the display portion 11 having the dual-domain structure.

Figure 17B:
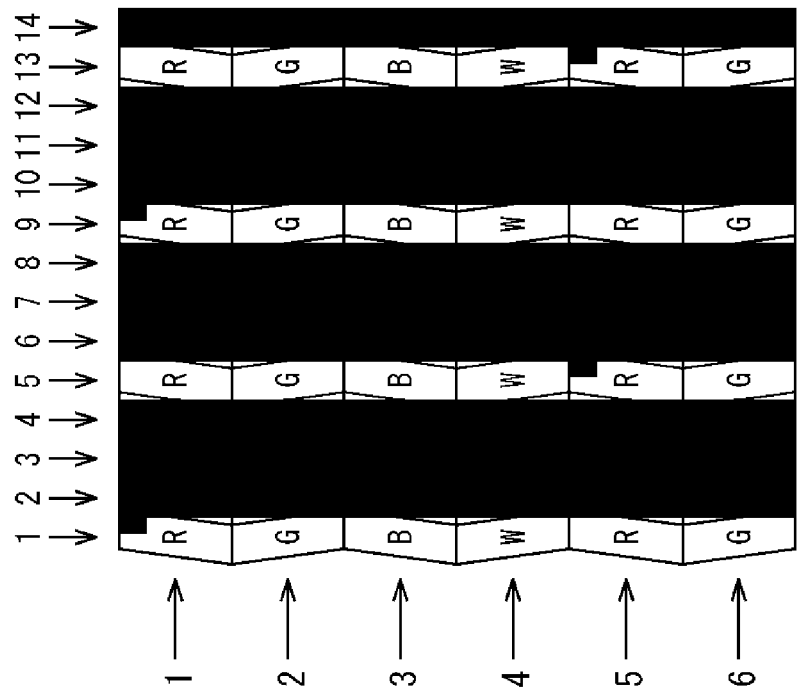
FIGS. 17A and 17B are respectively views explaining a relationship between an arrangement of sub pixels, and a parallax barrier in a display device according to a sixth embodiment of the present disclosure.
Figure 17A:
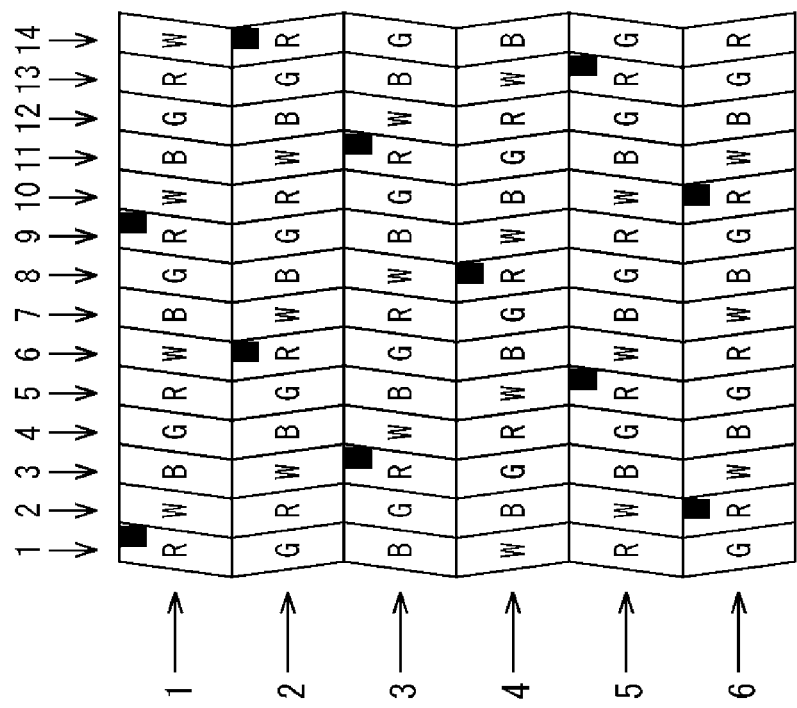

The arrangement of the sub pixels of the display device 11 shown in FIG. 17A is the same as that of the sub pixels of the display device 11 shown in FIG. 11A. In FIG. 17A, the spacers which are not illustrated in FIG. 11A are shown. The spacers are respectively provided in the sub pixels R which are located in the sub pixel 1-1, the sub pixel 9-1, the sub pixel 6-2, the sub pixel 14-3, the sub pixel 3-3, the sub pixel 11-3, the sub pixel 8-4, the sub pixel 5-5, the sub pixel 13-5, the sub pixel 2-6, and the sub pixel 10-6, respectively. In addition, the spacers are arranged on the upper sides of these sub pixels, respectively.

Four kinds of sub pixels having the different optical characteristics exist in the display portion 11 shown in FIG. 17A. Firstly, for example, like the pixel R of the sub pixel 1-1, there is the sub pixel which is tilted in the direction from bottom left to top right and which has optical characteristics 1 due to the provision of the spacer. In addition, like the pixel R of the sub pixel 6-2, there is the sub pixel which is tilted in the direction from bottom right to top left and which has optical characteristics 2 due to the provision of the spacer.

In addition, like the pixel R of the sub pixel 1-5, there is the sub pixel which is tilted in the direction from bottom left to top right and which has optical characteristics 3 due to no provision of the spacer. Also, like the pixel R of the sub pixel 2-2, there is the sub pixel which is tilted in the direction from bottom right to top left and which has optical characteristics 4 due to no provision of the spacer.

In the case where the spacer is provided in the sub pixels R of the red color, respectively, in such a manner, when attention is paid to the sub pixels R of the red color, the four kinds of optical characteristics 1 to 4 exist within the display portion 11. In addition, in the sub pixel other than the sub pixels R of the red color, for example, in the sub pixel G of the green color, there are the sub pixel which is tilted in the direction from bottom left to top right and which has the optical characteristics 3 due to no provision of the spacer, and the sub pixel which is tilted in the direction from bottom right to top left and which has optical characteristics 4 due to no provision of the spacer.

When there are the different optical characteristics in such a manner, preferably, the sub pixels having the same optical characteristics are arranged in the opening portions of the parallax barrier 12, respectively. For example, referring now to FIG. 17B, the longitudinal opening portion with the sub pixel 1-1 as the head includes: the sub pixel R having the optical characteristics 1; the sub pixels R and B each having the optical characteristics 3; and the sub pixels G and W each having the optical characteristics 4.

The longitudinal opening portion with the sub pixel 5-1 as the head also includes: the sub pixel R having the optical characteristics 1; the sub pixels R and B each having the optical characteristics 3; and the sub pixels G and W each having the optical characteristics 4. In addition thereto, the longitudinal opening portion with the sub pixel 9-1 as the head has the same arrangement of the sub pixels as that of the longitudinal sub pixels with the sub pixel 1-1 as the head. In addition, the longitudinal opening portion with the sub pixel 13-1 as the head has the same arrangement of the sub pixels as that of the longitudinal sub pixels with the sub pixel 5-1 as the head.

That is to say, in the case shown in FIG. 17B, the sub pixels are arranged in such a way that the sub pixels having the same optical characteristics are included in all of the opening portions, respectively. The optical characteristics of the opening portions (slits) are made identical to one another in such a manner, whereby it is possible to prevent the optical characteristics from being deteriorated as a whole. Therefore, in such a manner, the opening portions of the parallax barrier 12 are designed (the number of parallaxes is adjusted) in such a way that the optical characteristics of the opening portions (slits) become identical to one another. Or, the sub pixels are arranged and the spacers are also arranged in such a way that the optical characteristics of the opening portions become identical to one another.

As has been described, the arrangement of the sub pixels of the display portion 11, and the arrangement of the spacers are made suitable for the opening portions of the parallax barrier 12, whereby it is possible to prevent the deterioration of the optical characteristics. In addition, the arrangement of the opening portions of the parallax barrier 12 is made suitable for the arrangement of the sub pixels of the display portion 11, and the arrangement of the spacers, whereby it is possible to prevent the deterioration of the optical characteristics.

EXAMPLES OF APPLICATION

With Respect to Application of Display Device

The display device 10 of the present disclosure which has been described so far has a flat panel shape, and can be applied to various kinds of electronic apparatuses, for example, a digital camera, a notebook-size personal computer, a mobile phone, a video camera, and the like. The display device 10 of any of the first to sixth embodiments described above can be applied to the display devices, of electronic apparatuses in all of the fields, in each of which a video signal inputted from the outside to the electronic apparatus, or a video signal generated in the electronic apparatus is displayed in the form of an image or a video image. Hereinafter, examples of application of electronic apparatuses to each of which such a display device is applied will be described. Each of the electronic apparatus basically includes a main body for processing information, and a display device for displaying thereon an image based on either information inputted to the main body or information outputted from the main body.

First Example of Application

Figure 18:
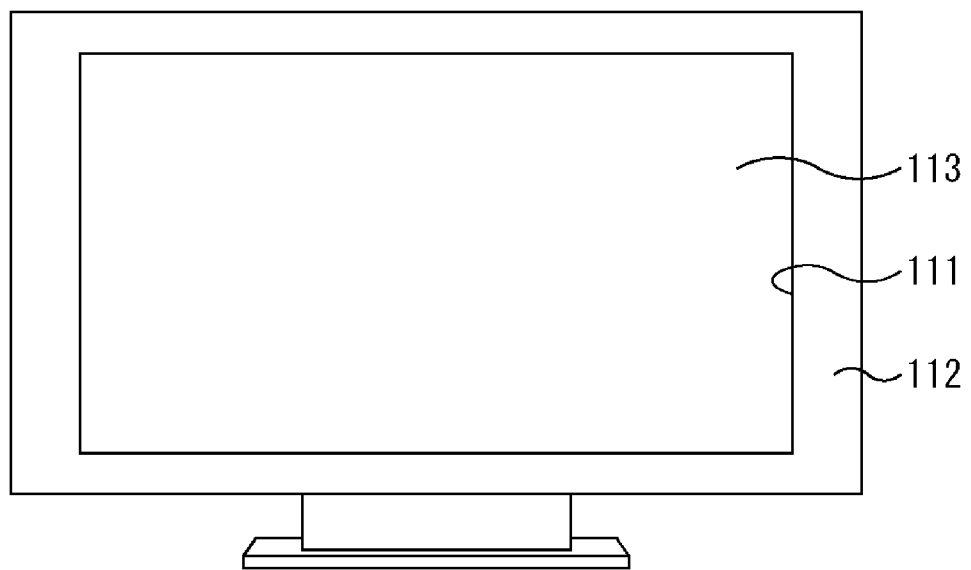
FIG. 18 is a front view showing an external appearance of a television set as a first example of application to which the display device according to the first embodiment of the present disclosure is applied.

FIG. 18 is a perspective view showing an external appearance of a television set as a first example of application to which the display device 10 according to the first embodiment of the present disclosure is applied. The television set includes an image display screen 111 composed of a front panel 112, a filter glass 113, and the like. In this case, the television set is manufactured by using the display device 10 of the first embodiment described above in the image display screen 111. For example, the 3D image is supplied to the user by the image display screen 111 composed of the display device 10.

Second Example of Application

In addition, the display device 10 according to the first embodiment of the present disclosure described above can also be applied to a notebook-size personal computer. A keyboard which is manipulated when characters or the like are inputted is included in a main body of the notebook-size personal computer. Also, a display portion for displaying thereon an image is included in a main body cover. The notebook-size personal computer is manufactured by using the display device 10 of the first embodiment in the display portion. For example, the 3D image is supplied to the user by the display portion composed of the display device 10.

Third Example of Application

In addition, the display device 10 according to the first embodiment of the present disclosure described above can also be applied to a personal digital assistance. The personal digital assistance includes an upper chassis, a lower chassis, a coupling portion (for example, a hinge portion), a display portion, a sub-display portion, a picture light, a camera, and the like. The personal digital assistance is manufactured by using the display device 10 of the first embodiment in the display portion and/or the sub-display portion. For example, the 3D image is supplied to the user by the display portion and/or the sub display portion composed of the display device 10.

Fourth Example of Application

In addition, the display device 10 according to the first embodiment of the present disclosure described above can also be applied to a video camera. The video camera includes a main body portion, a lens which captures an image of a subject and which is provided on a side surface directed forward, a start/stop switch which is manufactured when an image of a subject is captured, a monitor, and the like. The video camera is manufactured by using the display device 10 of the first embodiment in the monitor. For example, the 3D image is supplied to the user by the monitor composed of the display device 10.

In each of the embodiments described above, the description has been given by exemplifying the display device 10. However, the present disclosure does not mean that the application thereof is limited to the display device such as the display device 10. For example, the present disclosure can also be applied to any other suitable display device such as an organic EL (electroluminascence) display device. In addition, the present disclosure can also be applied to a multiple screen display device with which pictures having different angles of field are viewed.

It should be noted that the embodiments of the present disclosure are by no means limited to the embodiments described above, and thus various kinds of changes can be made without departing from the subject matter of the present disclosure.

It is noted that the present disclosure can also adopt the following constitutions.

(1) A display device including:
a display portion in which pixels having different optical characteristics are arranged; and
an opening portion arranged so as to face a display surface side of said display portion and causing a light from the display portion to pass in a predetermined direction,
in which with respect to the pixels having the different optical characteristics in the display portion, the pixels having the same color are located in the opening portion.

(2) The display device described in the paragraph (1), in which the pixels of the display portion are arranged in a dual-domain structure; and
the paired pixels having different optical characteristics and having the same color are located in the opening portion.

(3) A display device including:
a display portion in which pixels having different optical characteristics are arranged; and
an opening portion arranged so as to face a display surface side of the display portion and causing a light from the display portion to pass in a predetermined direction,
in which the opening portion is provided in such a position that a parallax image supplied to a predetermined point of view is composed of the pixels having the same optical characteristics in the display portion.

(4) A display device including:
a display portion in which pixels having different optical characteristics are arranged; and
an opening portion arranged so as to face a display surface side of the display portion and causing a light from the display portion to pass in a predetermined direction,
in which with respect to the pixels having the different optical characteristics in the display portion, the pixels having the same colors are present within the opening portion in a mixed manner.

(5) A display device including:
a display portion in which pixels having different optical characteristics are arranged; and
an opening portion arranged so as to face a display surface side of said display portion and causing a light from the display portion to pass in a predetermined direction,
in which with respect to the pixels having the different optical characteristics in the display portion, the pixels having the same color are included equally every opening portion.

(6) The display device described in the paragraph (5), in which the optical characteristics depend on whether or not a spacer exists.

The present disclosure contains subject matter related to that disclosed in Japanese Priority Patent Application JP 2012-055225 filed in the Japan Patent Office on Mar. 13, 2012, the entire content of which is hereby incorporated by reference.

What is claimed is:
1. A display device, comprising:
a display portion in which pixels of two kinds are arranged, the pixels of two kinds including a first pixel and a second pixel that have different optical characteristics from one another;

a parallax barrier arranged so as to face a display surface side of the display portion; and a slit that is arranged in the parallax barrier and that causes a light from the display portion to pass in a predetermined direction, wherein the first pixel and the second pixel have respective pixel electrodes that are tilted in different directions from one another to cause the different optical characteristics, respective ones of the pixels of two kinds corresponds to one of four color filters, and both of the first pixels and the second pixels that correspond to color filters of the same color are located in each of the slits.

2. A display device, comprising:

a display portion in which pixels of two kinds are arranged, the pixels of two kinds including a first pixel and a second pixel that have different optical characteristics from one another;

a parallax barrier arranged so as to face a display surface side of the display portion; and a slit that is arranged in the parallax barrier and that causes a light from the display portion to pass in a predetermined direction, wherein the first pixel and the second pixel have respective pixel electrodes that are tilted in different directions from one another to cause the different optical characteristics, respective ones of the pixels of two kinds correspond to one of four color filters, a parallax image supplied to a predetermined point of view includes an image composed of the pixels that are observed through the slits, and the pixels that correspond to color filters of the same color and are observed through the slits have the same optical characteristics as one another.

3. The display device according to claim 2, wherein the display portion has lines of pixels arranged in the first direction, in the lines of pixels, four pixels corresponding to the color filters of the four different colors are arranged repeatedly in the same order in a second direction perpendicular to the first direction, in the display portion, the four pixels are arranged in the first direction, shifting in the second direction by a length of k pixels, where k is 1, 2, or 3, in each line of the lines of pixels, the first pixels and second pixels, which have different optical characteristics from one another, are arranged, the first pixels and the second pixels are repeatedly arranged in the second direction in the same order, the parallax barrier has a plurality of slits arranged in the first direction, the slits extend in the second direction and form a strip pattern, the slits are arranged having a distance between the slits in such a manner that the pixels, which are observed through the slits and correspond to the color filters of the same color, have the same optical characteristics.

4. A display device, comprising:

a display portion in which pixels of two kinds are arranged, the pixels of two kinds including a first pixel and a second pixel that have different optical characteristics from one another;

a parallax barrier arranged so as to face a display surface side of the display portion; and a slit that is arranged in the parallax barrier and that causes a light from the display portion to pass in a predetermined direction, wherein the first pixel and the second pixel have the different optical characteristics from one another due to luminance differences caused by a spacer, respective ones of the pixels of two kinds correspond to one of four color filters, in each of the slits, the first pixels and the second pixels that correspond to color filters of at least a first color are present.

5. The display device according to claim 4, wherein the display portion has lines of pixels arranged in the first direction, in each line of the lines of pixels, the pixels corresponding to the color filters of the same color are arranged in a second direction perpendicular to the first direction, in the display portion, four lines of pixels, which each corresponds to the color filters of different colors, are arranged repeatedly in the same order in the first direction, the parallax barrier has the slits arranged in the first direction, the slit includes slit parts each having a width of s pixels in the first direction, where s is a positive nonzero integer, and in each of the slits, slit parts are arranged in the second direction, shifting in the first direction by one pixel width, the spacers are arranged in such manner that the pixels of two kinds are included in pixels that are observed through the slits and correspond to the color filters of at least the first color.

6. The display device according to claim 4, wherein the display portion has lines of pixels arranged in the first direction, in each line of the lines of pixels, the four pixels corresponding to the color filters of the different colors are arranged repeatedly in the same order in a second direction perpendicular to the first direction, in the display portion, the four pixels are arranged in the first direction, shifting by a width of k pixels in the second direction where k is 1, 2, or 3, in each line of the lines of pixels, the first pixels and the second pixels, which have different optical characteristics from one another, are included in the pixels corresponding to the color filter of at least the first color, the parallax barrier has slits in the first direction, each of the slits extends in a stripe in the second direction to form a stripe pattern.

7. The display device according to claim 1, wherein the display portion has lines of pixels that are arranged in the first direction, in each line of the lines of pixels, the pixels corresponding to the color filters of the same color are arranged in a second direction perpendicular to the first direction, in each line of the lines of pixels, the first pixels and second pixels, which have different optical characteristics from one another, are arranged, and the first pixels and the second pixels are arranged repeatedly in the same order in the second direction.

8. The display device according to claim 7, wherein in the display portion, in each line of the lines of pixels, the pixels corresponding to the color filters of one color are arranged, the lines of pixels corresponding to the four different colors are arranged repeatedly in the first direction in the same order, the parallax barrier has the slits arranged in the first direction, the slit includes slit parts each having a length of two pixels in the second direction, and in each of the slits, the slit parts are arranged sliding by a width of r pixels in the first direction, where r is 1 or 2.

9. A display device, comprising:

a display portion in which pixels of two kinds are arranged, the pixels of two kinds including a first pixel and a second pixel that have different optical characteristics from one another;

a parallax barrier arranged so as to face a display surface side of the display portion; and a slit that is arranged in the parallax barrier and causes a light from the display portion to pass in a predetermined direction, wherein the first pixel and the second pixel have different optical characteristics from one another due to luminance differences caused by a spacer, respective ones of the pixels of two kinds corresponds to one of four color filters, a parallax image supplied to a predetermined point of view includes an image composed of the pixels that are observed through the slits, and the pixels of two kinds are included in pixels that are observed through the slits and correspond to the color filters of at least a first color.

10. The display device according to claim 9, wherein the display portion has lines of pixels arranged in the first direction, in each line of the lines of pixels, the pixels corresponding to the color filters of the same color are arranged in a second direction perpendicular to the first direction, in the display portion, four lines of pixels, which each corresponds to the color filters of different colors, are arranged repeatedly in the same order in the first direction, the parallax barrier has the slits arranged in the first direction, the slit includes slit parts each having a width of s pixels in the first direction, where s is a positive nonzero integer, and in each of the slits, slit parts are arranged in the second direction, shifting in the first direction by one pixel width, the spacers are arranged in such manner that the pixels of two kinds are included in pixels that are observed through the slits and correspond to the color filters of at least the first color.

11. The display device according to claim 9, wherein the display portion has lines of pixels arranged in the first direction, in each line of the lines of pixels, the four pixels corresponding to the color filters of the different colors are arranged repeatedly in the same order in a second direction perpendicular to the first direction, in the display portion, the four pixels are arranged in the first direction, shifting by a width of k pixels in the second direction, where k is 1, 2, or 3, in each line of the lines of pixels, the first pixels and the second pixels, which have different optical characteristics from one another, are included in the pixels corresponding to the color filter of at least the first color, the parallax barrier has slits in the first direction, each of the slits extends in a stripe in the second direction to form a stripe pattern.

* * * * *